US011653224B2

(12) United States Patent
Mo et al.

(10) Patent No.: US 11,653,224 B2
(45) Date of Patent: May 16, 2023

(54) METHOD AND APPARATUS OF UE ADAPTIVE BEAM MANAGEMENT

(71) Applicant: Samsung Electronics Co., Ltd., Suwon-si (KR)

(72) Inventors: Jianhua Mo, Allen, TX (US); Yuqiang Heng, Austin, TX (US); Vutha Va, Plano, TX (US); Boon Loong Ng, Plano, TX (US); Dalin Zhu, Richardson, TX (US); Anum Ali, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 122 days.

(21) Appl. No.: 17/153,805

(22) Filed: Jan. 20, 2021

(65) Prior Publication Data
US 2021/0360432 A1 Nov. 18, 2021

Related U.S. Application Data

(60) Provisional application No. 63/060,540, filed on Aug. 3, 2020, provisional application No. 63/026,340, filed on May 18, 2020.

(51) Int. Cl.
*H04W 16/28* (2009.01)
*H04B 7/08* (2006.01)
(Continued)

(52) U.S. Cl.
CPC .......... *H04W 16/28* (2013.01); *H04B 7/0617* (2013.01); *H04B 7/086* (2013.01);
(Continued)

(58) Field of Classification Search
CPC .... H04W 16/28; H04W 24/10; H04B 7/0617; H04B 7/086; H04B 17/318; H04B 17/336;
(Continued)

(56) References Cited

U.S. PATENT DOCUMENTS 10,028,290 B2   7/2018 Jo et al.
10,339,950 B2   7/2019 Fienberg et al.
(Continued)

FOREIGN PATENT DOCUMENTS

WO   2017184190 A1   10/2017
WO   2020/076442 A1   4/2020

OTHER PUBLICATIONS

International Search Report dated Aug. 25, 2021 in connection with International Patent Application No. PCT/KR2021/006206, 3 pages.
(Continued)

*Primary Examiner* — Tejis Daya

(57) ABSTRACT

A method for operating an electronic device having a plurality of antenna modules, wherein at least one of the plurality of antenna modules is a serving module, comprises: triggering a module sweeping operation based on one or more of: a reference signal receive power (RSRP) of the serving module being below a dynamic, time-varying threshold; the RSRP of the serving module being lower than an average RSRP of the serving module when the electronic device is at a same location; an estimated angle of arrival of a beam being on an edge or outside of a coverage area of the serving module; inertial measurement unit (IMU) sensors indicating that the electronic device has rotated; or the RSRP of the serving module cannot support a predicted data requirement.

20 Claims, 23 Drawing Sheets

(51) Int. Cl.
*H04W 24/10* (2009.01)
*H04B 7/06* (2006.01)
*H04B 17/336* (2015.01)
*H04L 1/00* (2006.01)
*H04B 17/318* (2015.01)

(52) U.S. Cl.
CPC ......... *H04B 17/318* (2015.01); *H04B 17/336* (2015.01); *H04L 1/0003* (2013.01); *H04W 24/10* (2013.01)

(58) Field of Classification Search
CPC ..... H04B 7/0695; H04B 17/27; H04L 1/0003; H04L 1/0009
See application file for complete search history.

(56) References Cited

U.S. PATENT DOCUMENTS

| | | | | |
|---|---|---|---|---|
| 2011/0306347 | A1* | 12/2011 | Choi | H04W 36/04 455/438 |
| 2012/0155307 | A1* | 6/2012 | Turk | H04W 24/08 370/252 |
| 2012/0238272 | A1* | 9/2012 | Hwang | H04W 36/245 455/436 |
| 2014/0091973 | A1* | 4/2014 | Fang | H01Q 1/1257 343/703 |
| 2014/0170990 | A1* | 6/2014 | Black | H04B 1/401 455/73 |
| 2015/0055555 | A1* | 2/2015 | Kim | H04W 24/08 370/328 |
| 2015/0094003 | A1 | 4/2015 | Ramkumar et al. | |
| 2015/0236413 | A1* | 8/2015 | Turpin | H01Q 3/34 342/368 |
| 2018/0212668 | A1* | 7/2018 | Athley | H04W 72/085 |
| 2018/0284149 | A1* | 10/2018 | Kommi | G01P 15/08 |
| 2018/0343043 | A1* | 11/2018 | Hakola | H04B 7/0617 |
| 2020/0028544 | A1 | 1/2020 | Bengtsson et al. | |
| 2020/0076493 | A1 | 3/2020 | Lee et al. | |
| 2020/0274590 | A1* | 8/2020 | Martin | H04B 7/0617 |
| 2021/0167875 | A1* | 6/2021 | Shen | H04W 16/28 |
| 2021/0195436 | A1* | 6/2021 | Hong | H04B 7/088 |

OTHER PUBLICATIONS

Written Opinion of the International Searching Authority dated Aug. 25, 2021 in connection with International Patent Application No. PCT/KR2021/006206, 4 pages.

* cited by examiner

METHOD AND APPARATUS OF UE ADAPTIVE BEAM MANAGEMENT

CROSS-REFERENCE TO RELATED APPLICATION(S) AND CLAIM OF PRIORITY

This application claims priority under 35 U.S.C. § 119(e) to U.S. Provisional Patent Application No. 63/026,340 filed on May 18, 2020 and U.S. Provisional Patent Application No. 63/060,540 filed on Aug. 3, 2020. The above-identified provisional patent applications are hereby incorporated by reference in their entirety.

TECHNICAL FIELD

This disclosure relates generally to electronic devices. More specifically, this disclosure relates to a method and apparatus of user equipment adaptive beam management.

BACKGROUND

The use of mobile computing technology such as a portable electronic device, including radio devices, has greatly expanded largely due to usability, convenience, computing power, and the like. Typically, multiple antenna modules are placed on the portable electronic device to avoid coverage holes and to increase the robustness of hand/body blockage, and the electronic device uses one or more of the antenna modules for communication. The electronic device may choose to switch to another antenna module to maintain a good connection with a base station. To find out which antenna module is suitable for communication, a module sweeping is usually adopted. However, the module sweeping incurs cost, including the latency and energy overhead to turn on/off the antenna modules.

SUMMARY

This disclosure provides methods and apparatuses for user equipment adaptive beam management in wireless communication systems.

In a first embodiment, an electronic device includes a plurality of antenna modules, wherein at least one of the plurality of antenna modules is a serving module. The electronic device further includes a transceiver operably connected with at least one of the plurality of antenna modules. The electronic device further includes a processor operably connected to the transceiver. The processor is configured to trigger a module sweeping operation based on one or more of: a reference signal receive power (RSRP) of the serving module being below a dynamic, time-varying threshold; the RSRP of the serving module being lower than an average RSRP of the serving module when the electronic device is at a same location; an estimated angle of arrival of a beam being on an edge or outside of a coverage area of the serving module; inertial measurement unit (IMU) sensors indicating that the electronic device has rotated; or the RSRP of the serving module cannot support a predicted data requirement.

In another embodiment, a method for operating an electronic device having a plurality of antenna modules, wherein at least one of the plurality of antenna modules is a serving module, is provided. The method comprises: triggering a module sweeping operation based on one or more of: a reference signal receive power (RSRP) of the serving module being below a dynamic, time-varying threshold; the RSRP of the serving module being lower than an average RSRP of the serving module when the electronic device is at a same location; an estimated angle of arrival of a beam being on an edge or outside of a coverage area of the serving module; inertial measurement unit (IMU) sensors indicating that the electronic device has rotated; or the RSRP of the serving module cannot support a predicted data requirement.

Other technical features may be readily apparent to one skilled in the art from the following FIGURES, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIG. 1 through FIG. 23, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Figure 1:
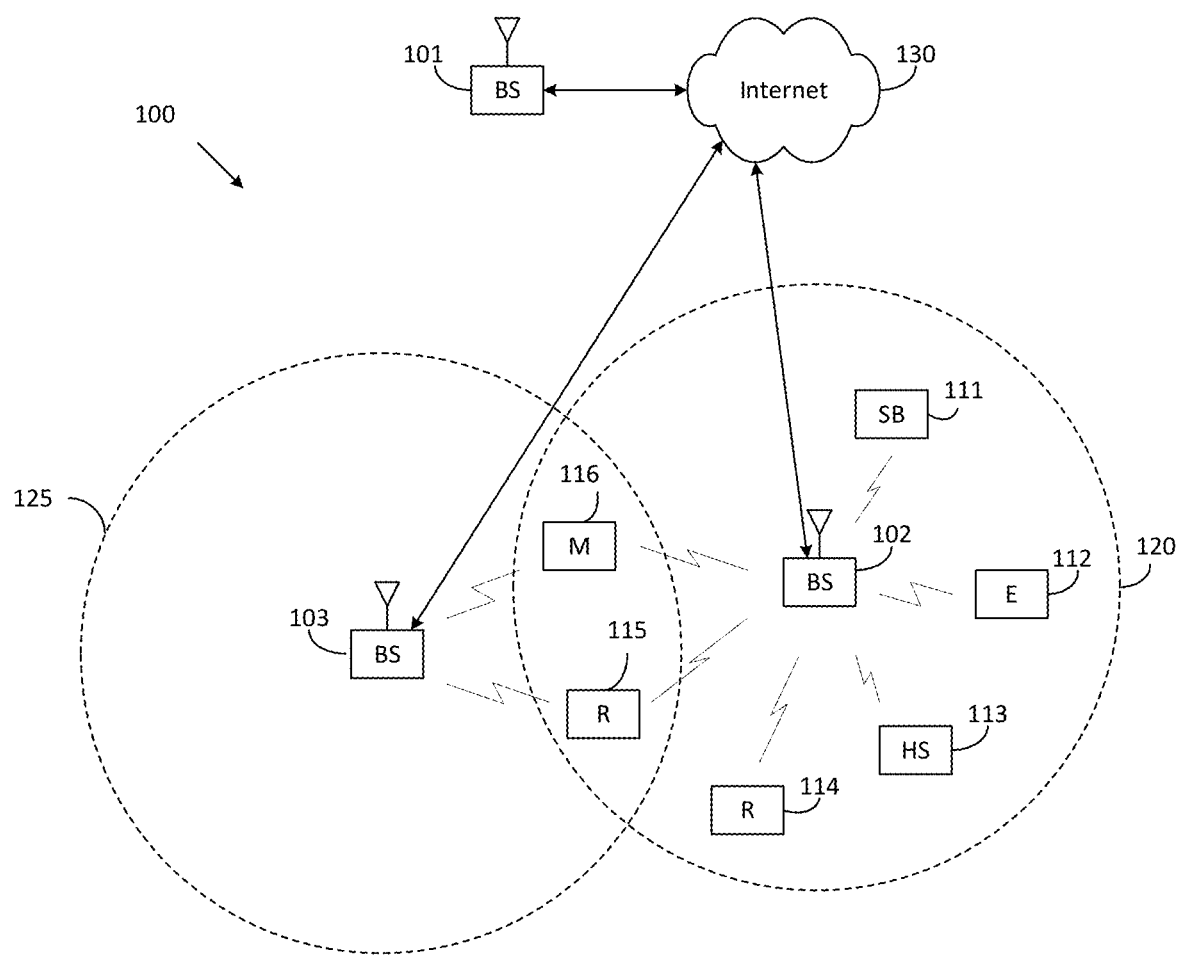
FIG. 1 illustrates an example wireless network according to embodiments of the present disclosure.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of electronic devices within a coverage area 120 of the gNB 102. The first plurality of electronic devices includes an electronic device 111, which may be located in a small business; an electronic device 112, which may be located in an enterprise (E); an electronic device 113, which may be located in a WiFi hotspot (HS); an electronic device 114, which may be located in a first residence (R); an electronic device 115, which may be located in a second residence (R); and an electronic device 116, which may be a mobile device (M), such as a cell phone, a wireless laptop, a wireless PDA, or the like. The gNB 103 provides wireless broadband access to the network 130 for a second plurality of electronic devices within a coverage area 125 of the gNB 103. The second plurality of electronic devices includes the electronic device 115 and the electronic device 116. In some embodiments, one or more of the gNBs 101-103 may communicate with each other and with the electronic devices 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "electronic device" can refer to any component such as "mobile station," "subscriber station," "remote terminal," "wireless terminal," "receive point," "user equipment" or "UE", or "user device." For the sake of convenience, the terms "electronic device", "user equipment", and "UE" are used in this patent document to refer to remote wireless equipment that wirelessly accesses a BS, whether the electronic device is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the electronic devices 111-116 include a plurality of antenna modules, wherein at least one of the plurality of antenna modules is a serving module, and include circuitry, programing, or a combination thereof, for triggering a module sweeping operation based on one or more of: a reference signal receive power (RSRP) of the serving module being below a dynamic, time-varying threshold; the RSRP of the serving module being lower than an average RSRP of the serving module when the electronic device is at a same location; an estimated angle of arrival of a beam being on an edge or outside of a coverage area of the serving module; inertial measurement unit (IMU) sensors indicating that the electronic device has rotated; or the RSRP of the serving module cannot support a predicted data requirement.

Although FIG. 1 illustrates one example of a wireless network, various changes may be made to FIG. 1. For example, the wireless network could include any number of gNBs and any number of electronic devices in any suitable arrangement. Also, the gNB 101 could communicate directly with any number of electronic devices and provide those electronic devices with wireless broadband access to the network 130. Similarly, each gNB 102-103 could communicate directly with the network 130 and provide electronic devices with direct wireless broadband access to the network 130. Further, the gNBs 101, 102, and/or 103 could provide access to other or additional external networks, such as external telephone networks or other types of data networks.

Figure 2:
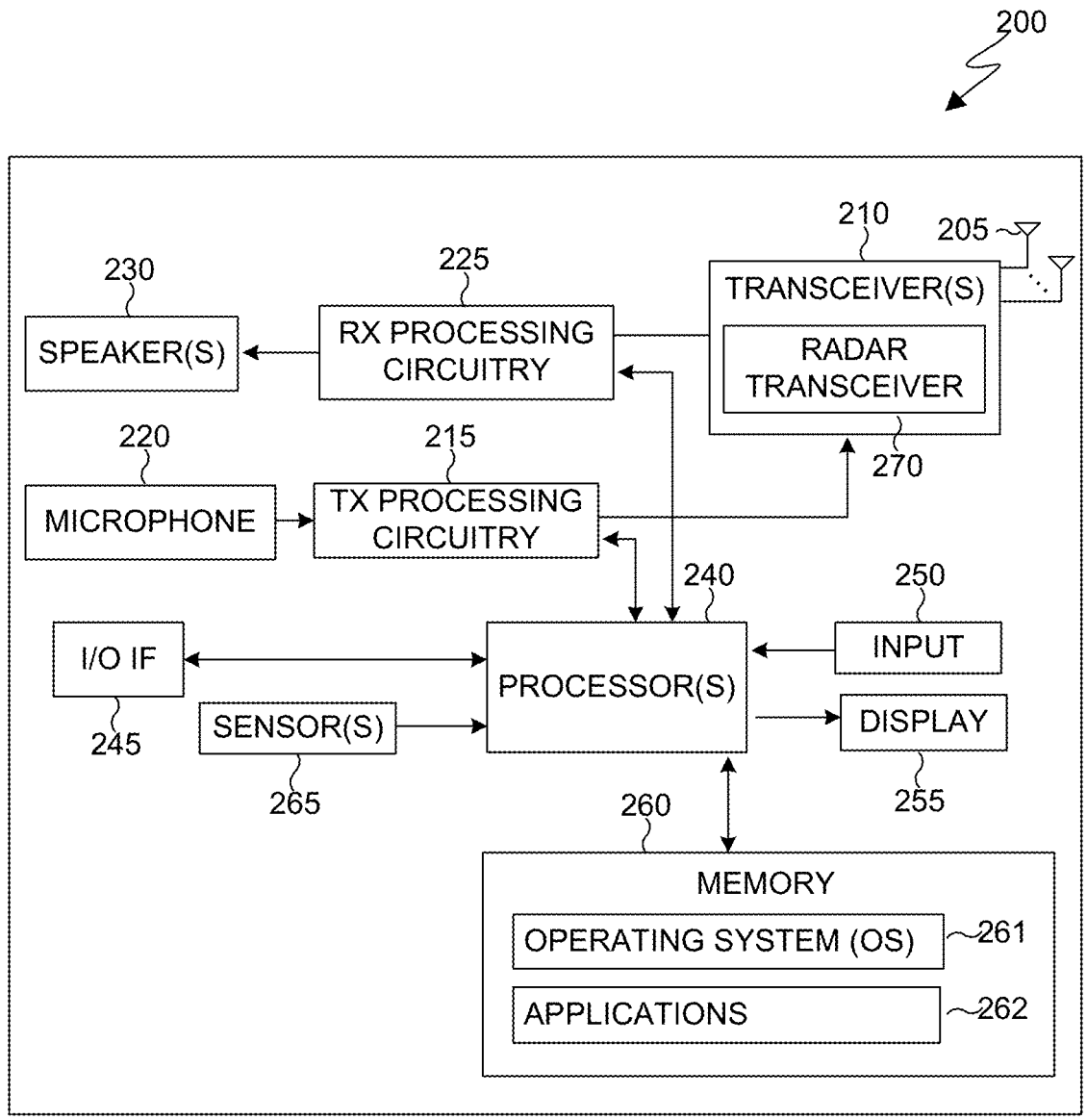
FIG. 2 illustrates an example electronic device according to embodiments of this disclosure.

FIG. 2 illustrates an example electronic device 200 according to embodiments of this disclosure. The electronic device 200 can be a mobile communication device, such as, for example, a mobile station, a subscriber station, a wireless terminal, a desktop computer a portable electronic device and the like.

As shown in FIG. 2, the electronic device 200 includes transceiver(s) 210, transmit (TX) processing circuitry 215, a microphone 220, and receive (RX) processing circuitry 225. The transceiver(s) 210 can include, for example, a RF transceiver, a BLUETOOTH transceiver, a WI-FI transceiver, a ZIGBEE transceiver, an infrared transceiver, and various other wireless communication signals. The electronic device 200 also includes a speaker 230, a processor 240, an input/output (I/O) interface (IF) 245, an input 250, a display 255, a memory 260, a sensor(s) 265, and a camera 275. The memory 260 includes an operating system (OS) 261, and one or more applications 262.

The transceiver(s) 210 can include an antenna array including numerous antennas. The transceiver(s) 210 can transmit and receive a signal or power to or from the electronic device 200. The transceiver 210 transmits signals to other components in a system and receives incoming signals transmitted by other components in the system. For example, the transceiver 110 transmits and receives RF signals, such as BLUETOOTH or WI-FI signals, to and from an access point (such as a base station, WI-FI router, BLUETOOTH device) of a network (such as a WI-FI, BLUETOOTH, cellular, 5G, LTE, LTE-A, WiMAX, or any other type of wireless network). The received signal is processed by the RX processing circuitry 225. The RX processing circuitry 225 may transmit the processed signal to the speaker 230 (such as for voice data) or to the processor 240 for further processing (such as for web browsing data). The TX processing circuitry 215 receives voice data from the microphone 220 or other outgoing data from the processor 240. The outgoing data can include web data, e-mail, or interactive video game data. The TX processing circuitry 215 processes the outgoing data to generate a processed signal. The transceiver 210 receives the outgoing processed signal from the TX processing circuitry 215 and converts the received signal to an RF signal that is transmitted via an antenna. In other embodiments, the transceiver 210 can transmit and receive radar signals to detect the potential presence of an object in the surrounding environment of the electronic device 200.

In this embodiment, one of the one or more transceivers in the transceiver 210 includes is a radar transceiver 270 configured to transmit and receive signals for detection and ranging purposes. For example, the radar transceiver 270 may be any type of transceiver including, but not limited to a WiFi transceiver, for example, an 802.11ay transceiver. The radar transceiver 270 includes an antenna array that includes transmitter and receiver antenna arrays. The antenna array may include an antenna including a radiating element composed of a conductive material or a conductive pattern formed in or on a substrate (e.g., PCB). An additional component (e.g., a radio frequency integrated circuit (RFIC)) other than the radiating element may be additionally formed as part of the antenna array. The radar transceiver 270 can transmit signals at a frequency less than or equal to 100 GHz. For example, the transmitter 257 can transmit signals at frequencies including, but not limited to, 6-8 GHz, 28 GHz, 39 GHz, 60 GHz, and 77 GHz. In some embodiments, the signals transmitted by the radar transceiver 270 can include, but are not limited to, millimeter wave (mm-Wave) signals. The radar transceiver 270 can receive the signals, which were originally transmitted from the radar transceiver 270, after the signals have bounced or reflected off of target objects in the surrounding environment of the electronic device 200. The processor 240 can analyze the time difference between when the signals are transmitted by the radar transceiver 270 and received by the radar transceiver 270 to measure the distance of the target objects from the electronic device 200.

The TX processing circuitry 215 receives analog or digital voice data from the microphone 220 or other outgoing baseband data (such as web data, e-mail, or interactive video game data) from the main processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna 205.

The processor 240 can include one or more processors or other processing devices. The processor 240 can execute instructions that are stored in the memory 260, such as the OS 261 in order to control the overall operation of the electronic device 200. For example, the processor 240 could control the reception of forward channel signals and the transmission of reverse channel signals by the RF transceiver 210, the RX processing circuitry 225, and the TX processing circuitry 215 in accordance with well-known principles. The processor 240 can include any suitable number(s) and type(s) of processors or other devices in any suitable arrangement. For example, in certain embodiments, the processor 240 includes at least one microprocessor or microcontroller. Example types of processor 240 include microprocessors, microcontrollers, digital signal processors, field programmable gate arrays, application specific integrated circuits, and discrete circuitry. In certain embodiments the processor 240 can include a neural network.

The processor 240 is also capable of executing other processes and programs resident in the memory 260, such as operations that receive and store data. The processor 240 can move data into or out of the memory 260 as required by an executing process. In certain embodiments, the processor 140 is configured to execute the one or more applications 262 based on the OS 261 or in response to signals received from external source(s) or an operator. Example, applications 262 can include an authentication program as well as a program or file that requires authentication prior to accessing.

The processor 240 is also coupled to the I/O interface 245 that provides the electronic device 200 with the ability to connect to other devices. The I/O interface 245 is the communication path between these accessories and the processor 240.

The processor 240 is also coupled to the input 250 and the display 255. The operator of the electronic device 200 can use the input 250 to enter data or inputs into the electronic device 200. The input 250 can be a keyboard, touchscreen, mouse, track ball, voice input, or other device capable of acting as a user interface to allow a user in interact with the electronic device 200. For example, the input 250 can include voice recognition processing, thereby allowing a user to input a voice command. In another example, the input 250 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 250 can be associated with the sensor(s) 265 and/or a camera by providing additional input to the processor 240. In certain embodiments, the sensor 265 includes one or more inertial measurement units (IMUs) (such as accelerometers, gyroscope, and magnetometer), motion sensors, optical sensors, cameras, pressure sensors, heart rate sensors, altimeter, and the like. The input 250 can also include a control circuit. In the capacitive scheme, the input 250 can recognize touch or proximity. In certain embodiments, the input 250 includes the antenna 205 which can emit and recite radar signals for authenticating a user.

The display 255 can be a liquid crystal display (LCD), light-emitting diode (LED) display, organic LED (OLED), active matrix OLED (AMOLED), or other display capable of rendering text and/or graphics, such as from websites, videos, games, images, and the like. The display 255 can be sized to fit within a HMD. The display 255 can be a singular display screen or multiple display screens capable of creating a stereoscopic display. In certain embodiments, the display 255 is a heads-up display (HUD).

The memory 260 is coupled to the processor 240. Part of the memory 260 could include a RAM, and another part of the memory 260 could include a Flash memory or other ROM. The memory 260 can include persistent storage (not shown) that represents any structure(s) capable of storing and facilitating retrieval of information (such as data, program code, and/or other suitable information). The memory 260 can contain one or more components or devices supporting longer-term storage of data, such as a read only memory, hard drive, Flash memory, or optical disc. The memory 260 also can sensitive and confidential information, which require user authentication prior to accessing.

The electronic device 200 further includes one or more sensors 265 that can meter a physical quantity or detect an activation state of the electronic device 200 and convert metered or detected information into an electrical signal. For example, the sensor 265 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 265 can further include control circuits for controlling any of the sensors included therein. Any of these sensor(s) 265 may be located within the electronic device 200, within a secondary device operably connected to the electronic device 200, within a headset configured to hold the electronic device 200, or in a singular device where the electronic device 200 includes a headset.

In certain embodiments, the radar transceiver 270 can include a transmitter and a receiver. The transmitter can transmit millimeter wave (mmWave) signals. The receiver can receive the mmWave signals originally transmitted from the transmitter after the mmWave signals have bounced or reflected off of target objects in the surrounding environment of the electronic device 200. The processor 240 can analyze the time difference between when the mmWave signals are transmitted and received to measure the distance of the target objects from the electronic device 200. Based on the time differences, the processor 240 can generate an image of the object by mapping the various distances.

Although FIG. 2 illustrates one example of electronic device 200, various changes can be made to FIG. 2. For example, various components in FIG. 2 can be combined, further subdivided, or omitted and additional components can be added according to particular needs. As a particular example, the processor 240 can be divided into multiple processors, such as one or more central processing units (CPUs), one or more graphics processing units (GPUs), one or more neural networks, and the like. Also, while FIG. 2 illustrates the electronic device 200 configured as a mobile telephone, tablet, or smartphone, the electronic device 200 can be configured to operate as other types of mobile or stationary devices, including, for example, without limitation a robot.

Figure 3:
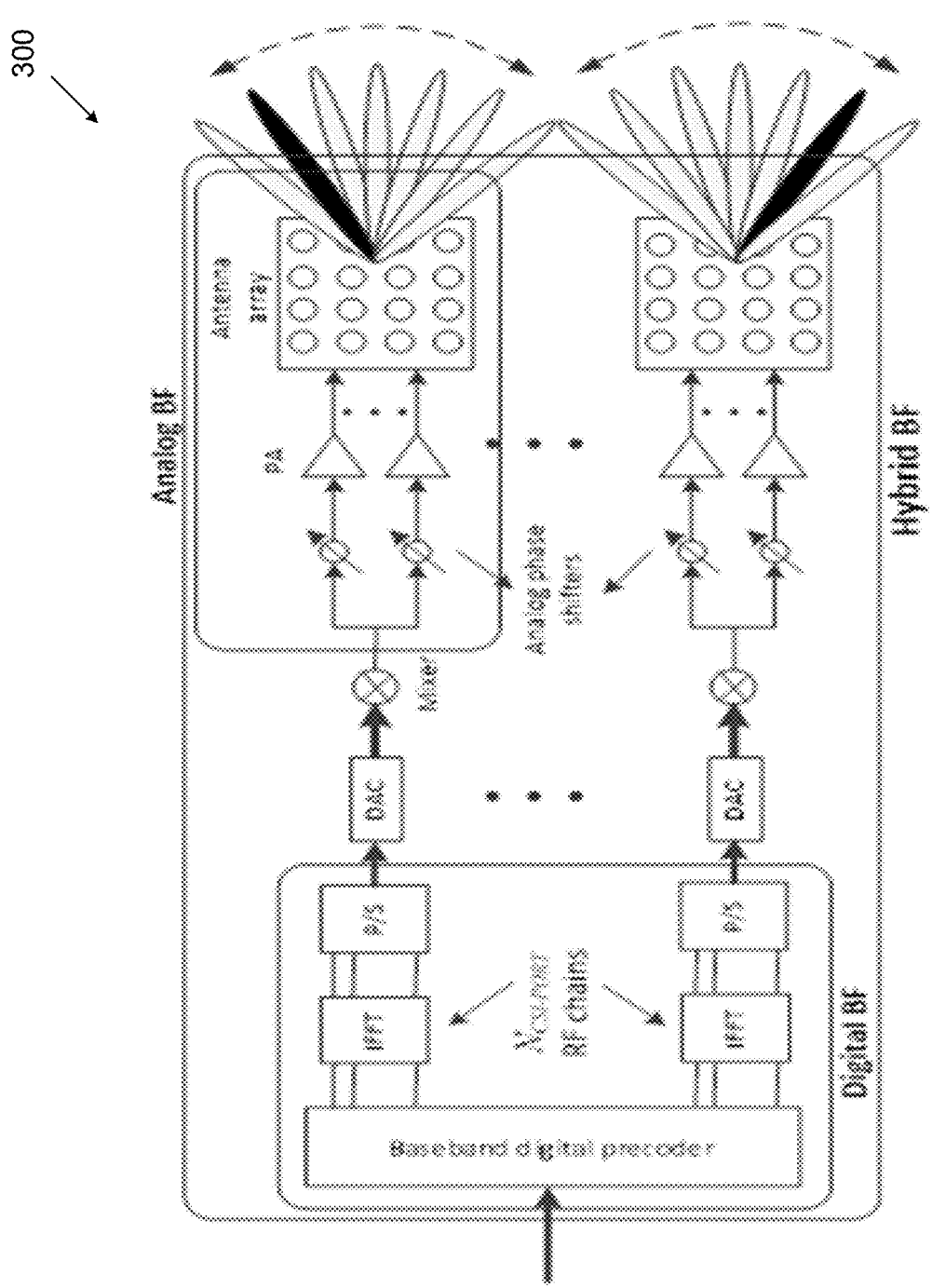
FIG. 3 illustrates an example architecture to achieve hybrid beamforming according to embodiments of this disclosure.

FIG. 3 illustrates an example antenna architecture 300 to achieve hybrid beamforming according to embodiments of this disclosure. The embodiment of FIG. 3 is for illustration only. Other embodiments can be used without departing from the scope of the present disclosure.

For mmWave bands, the number of antenna elements can be large for a given form factor. However, the number of digital chains is limited due to hardware constraints (such as the feasibility to install a large number of ADCs/DACs at mmWave frequencies) as illustrated in FIG. 3. For example, one digital chain is mapped onto a large number of antenna elements which can be controlled by a bank of analog phase shifters. One digital chain can then correspond to one sub-array which produces a narrow analog beam through analog beamforming. This analog beam can be configured to sweep across a wider range of angles by varying the phase shifter bank across a transmission time interval. The hybrid beamforming architecture as illustrated in FIG. 3 can be applied at a base station and at a user equipment (UE) such as the electronic device 200.

Figure 4:
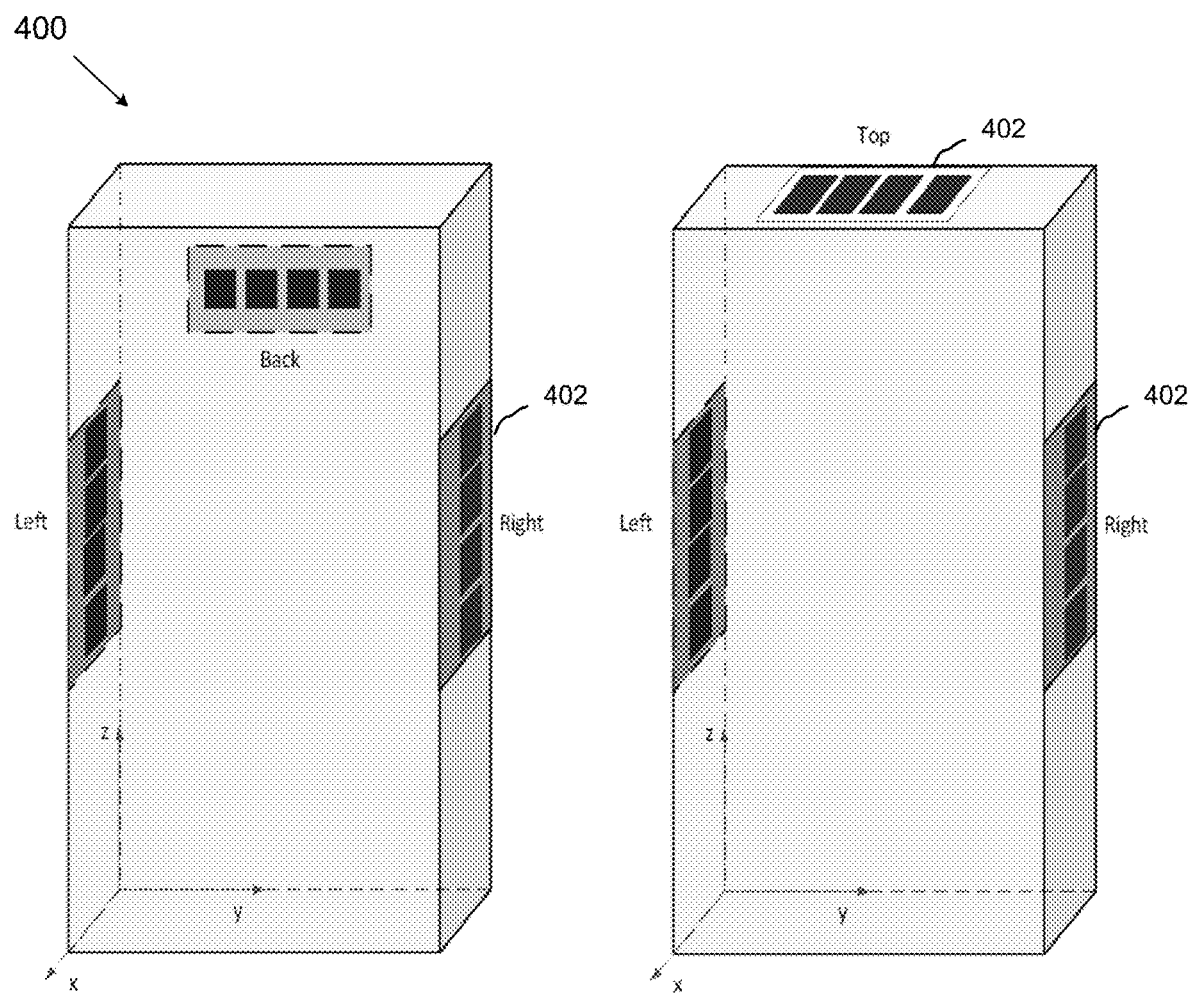
FIG. 4 illustrates examples of antenna module placement according to embodiments of this disclosure.

FIG. 4 illustrates examples of antenna module placement 400 according to embodiments of this disclosure. The embodiments of FIG. 4 are for illustration only. Other embodiments can be used without departing from the scope of the present disclosure.

As illustrated in FIG. 4, multiple antenna modules 402 are placed on the electronic device, such as a 5G terminal or UE, to avoid coverage holes on the sphere and increase the robustness of hand/body blockage. Two examples of module placement are provided in FIG. 4. In one example, three modules 402 are placed on a right edge, a left edge, and the back, respectively, of the UE, while in the other example, three modules 402 are placed on the right edge, the left edge, and a top edge, respectively, of the UE.

If the reference signal received power (RSRP) of the serving module, which is the module used for data transmission, is below a threshold, or the UE moves/rotates, or the channel changes, or the temperature of the current antenna module is too high, the UE device may choose to switch to another antenna module to maintain a good connection with the BS and/or control the temperature. To determine which antenna module is suitable for communication, a module sweeping operation is usually adopted. A beam (or a few beams) from each module is activated to measure the channel quality, for example, the RSRP, or signal-to-noise ratio (SNR) or signal-to-noise- and interference ratio (SINR). After performing measurement with the modules, the UE determines which module to switch to based on the measurement results.

Figure 5:
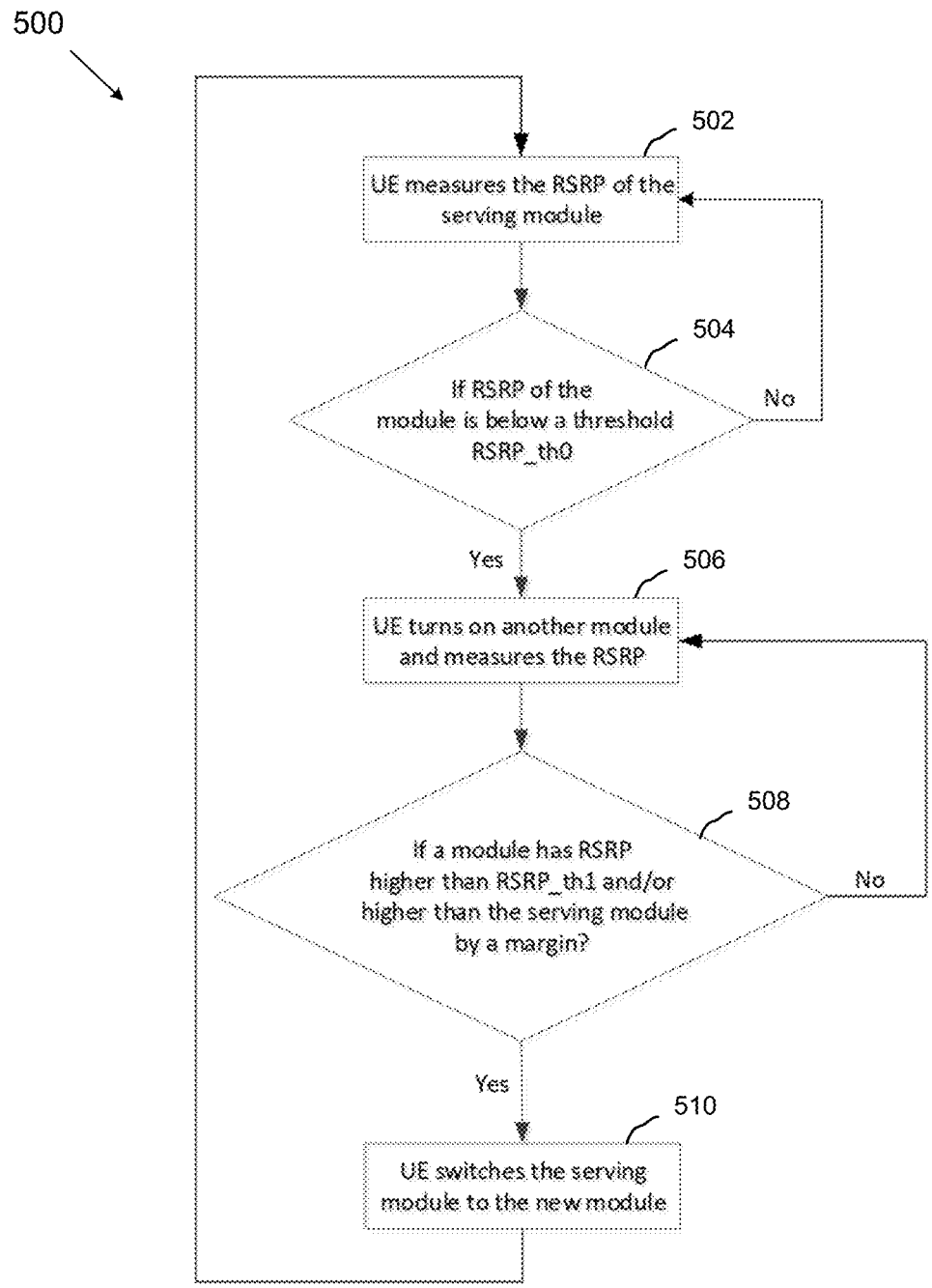
FIG. 5 illustrates a flow chart of a method for operating an electronic device according to embodiments of the present disclosure.

FIG. 5 illustrates a flow chart of a method 500 for operating an electronic device, as may be performed by an electronic device such as electronic device 116, according to embodiments of the present disclosure. The embodiment of the method 500 illustrated in FIG. 5 is for illustration only. FIG. 5 does not limit the scope of this disclosure to any particular implementation. In one embodiment, the modules are activated sequentially.

As illustrated in FIG. 5, the method 500 begins at step 502. In step 502, the electronic device (e.g., 111-116 as illustrated in FIG. 1), measures the RSRP of the serving module.

In step 504, the electronic device determines whether the RSRP of the serving module is below a first threshold. If the RSRP of the serving module is not below the first threshold, then the method reverts to step 502. If the RSRP of the serving module is below the first threshold, then the method proceeds to step 506.

In step 506, the electronic device turns on another module and measures the RSRP of that module.

In step 508, the electronic device determines whether the RSRP of the other module is greater than a second threshold and/or greater than the RSRP of the serving module by a margin. If the RSRP of the other module is not greater than the second threshold and/or greater than the RSRP of the serving module by a margin, then the method reverts to step 506. If the RSRP of the other module is greater than the second threshold and/or greater than the RSRP of the serving module by a margin, then the method proceeds to step 510.

In step 510, the electronic device switches the serving module to the other module.

The "module sweeping" described above incurs cost, including the latency and energy overhead to turn on/off the antenna modules, and possibly block error rate increase. If fixed RSRP thresholds, (fixed RSRP_th0 and RSRP_th1), are adopted, the beam management may not work well in a dynamic scenario. A high RSRP threshold RSRP_th0 causes frequent and unnecessary module sweeping but can result in a higher RSRP of the serving module, while a low RSRP threshold causes less module sweeping, but can result in a lower RSRP of the serving module as well. A good tradeoff solution, which achieves relatively higher RSRP of the serving module and relatively less module sweeping simultaneously is preferred.

Although RSRP threshold is assumed the target adaptation parameter throughout this disclosure, other metrics representing signal strength can also be used such as SNR threshold or SINR threshold.

In one embodiment, the electronic device determines the beam operation parameters, including but not limited to RSRP_th0, RSRP_th1, according to the recent electronic device measurements, instead of setting the parameters as fixed values.

In one approach, the threshold RSRP_th0 could be determined based on the recent RSRP measurement. In one approach, the current RSRP measurement is determined by the average RSRP. The average RSRP could be simple moving average, weighted moving average, and exponential moving average, etc.

Denote the RSRP of the serving module at time t: $P_{SM}(t)$.
1. For the case of exponential moving average, the short term average RSRP and long term average RSRP could be defined as follows.

$$\tilde{P}_{SM}(t)=\tilde{P}_{SM}(t-1)+\tilde{\alpha}(P_{SM}(t)-\tilde{P}_{SM}(t-1))  \quad \text{Short term average}$$

$$\overline{P}_{SM}(t)=\overline{P}_{SM}(t-1)+\overline{\alpha}(P_{SM}(t)-\overline{P}_{SM}(t-1))  \quad \text{Long term average}$$

$\tilde{\alpha}, \overline{\alpha}(0<\overline{\alpha}<\tilde{\alpha}<1)$: decay rate for the exponential filter that estimates the short/long term average.

An advantage is that the exponential moving average does not require saving of the raw RSRP measurement values, and hence requires less memory.

2. For the case of simple moving average, the short term average RSRP and long term average RSRP could be defined as follows.
Short term average:

$$\tilde{P}_{SM}(t) = \frac{1}{M+1}(P_{SM}(t) + P_{SM}(t-1) + \ldots + P_{SM}(t-M))$$

Long term average:

$$\overline{P}_{SM}(t) = \frac{1}{N+1}(P_{SM}(t) + P_{SM}(t-1) + \ldots + P_{SM}(t-N))$$

M, N (M<N): the window length of the moving average

At the initial stage where there is not enough RSRP measurements to be evaluated (e.g., t<M), the simple moving average may be computed over the available measurements. Alternatively, the default value of $\tilde{P}_{SM}(t)$ and $\overline{P}_{SM}(t)$ can be a measurement value of SSB resource which corresponds to the electronic device transmitted PRACH resource.

The short term average could capture the fast channel change due to the hand/body blockage, electronic device rotation, etc. The long term average could capture the slow channel change, i.e., cell center/edge, building blockage, etc. Note that the short/long term average is computed and maintained per electronic device and per cell. If the electronic device connects to another cell, it has to re-compute the average RSRP of the serving module.

Figure 6:
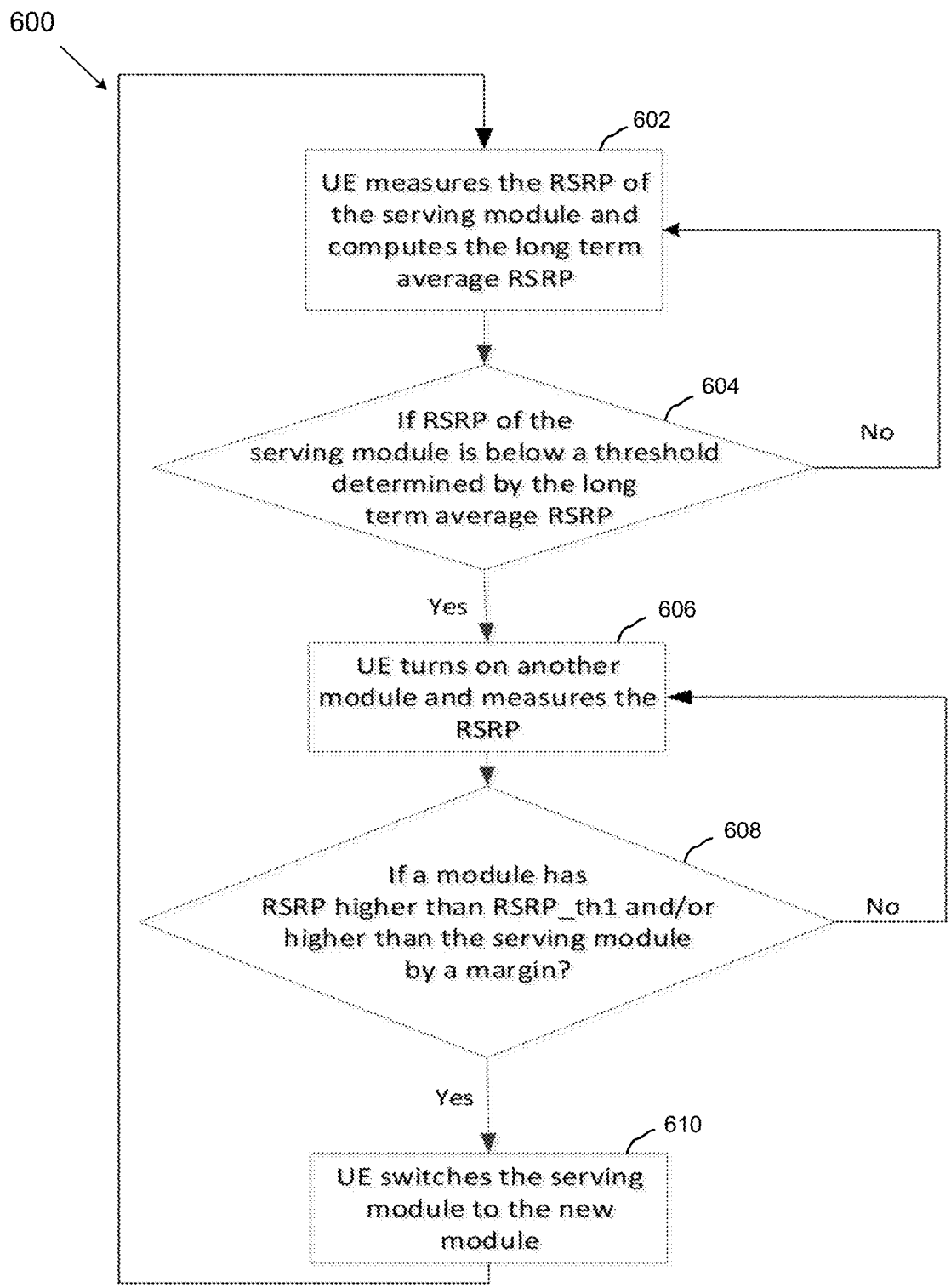
FIG. 6 illustrates a flow chart of a method for operating an electronic device according to embodiments of the present disclosure.

In one approach, the electronic device determines the RSRP_th0=$\overline{P}_{SM}(t)+\delta$, and if the current RSRP is less than $\overline{P}_{SM}(t)+\delta$, the electronic device starts measuring other modules, as illustrated in FIG. 6.

FIG. 6 illustrates a flow chart of a method 600 for operating an electronic device, as may be performed by an electronic device such as electronic device 116, according to embodiments of the present disclosure. The embodiment of the method 600 illustrated in FIG. 6 is for illustration only. FIG. 6 does not limit the scope of this disclosure to any particular implementation.

As illustrated in FIG. 6, the method 600 begins at step 602. In step 602, the electronic device (e.g., 111-116 as illustrated in FIG. 1), measures the RSRP of the serving module and computes the long term average RSRP.

In step 604, the electronic device determines whether the RSRP of the serving module is below a first threshold determined by the long term average RSRP. If the RSRP of the serving module is not below the first threshold determined by the long term average RSRP, then the method reverts to step 602. If the RSRP of the serving module is below the first threshold determined by the long term average RSRP, then the method proceeds to step 606.

In step 606, the electronic device turns on another module and measures the RSRP of that module.

In step 608, the electronic device determines whether the RSRP of the other module is greater than a second threshold and/or greater than the RSRP of the serving module by a margin. If the RSRP of the other module is not greater than the second threshold and/or greater than the RSRP of the serving module by a margin, then the method reverts to step 506. If the RSRP of the other module is greater than the second threshold and/or greater than the RSRP of the serving module by a margin, then the method proceeds to step 610.

In step 610, the electronic device switches the serving module to the other module.

Figure 7:
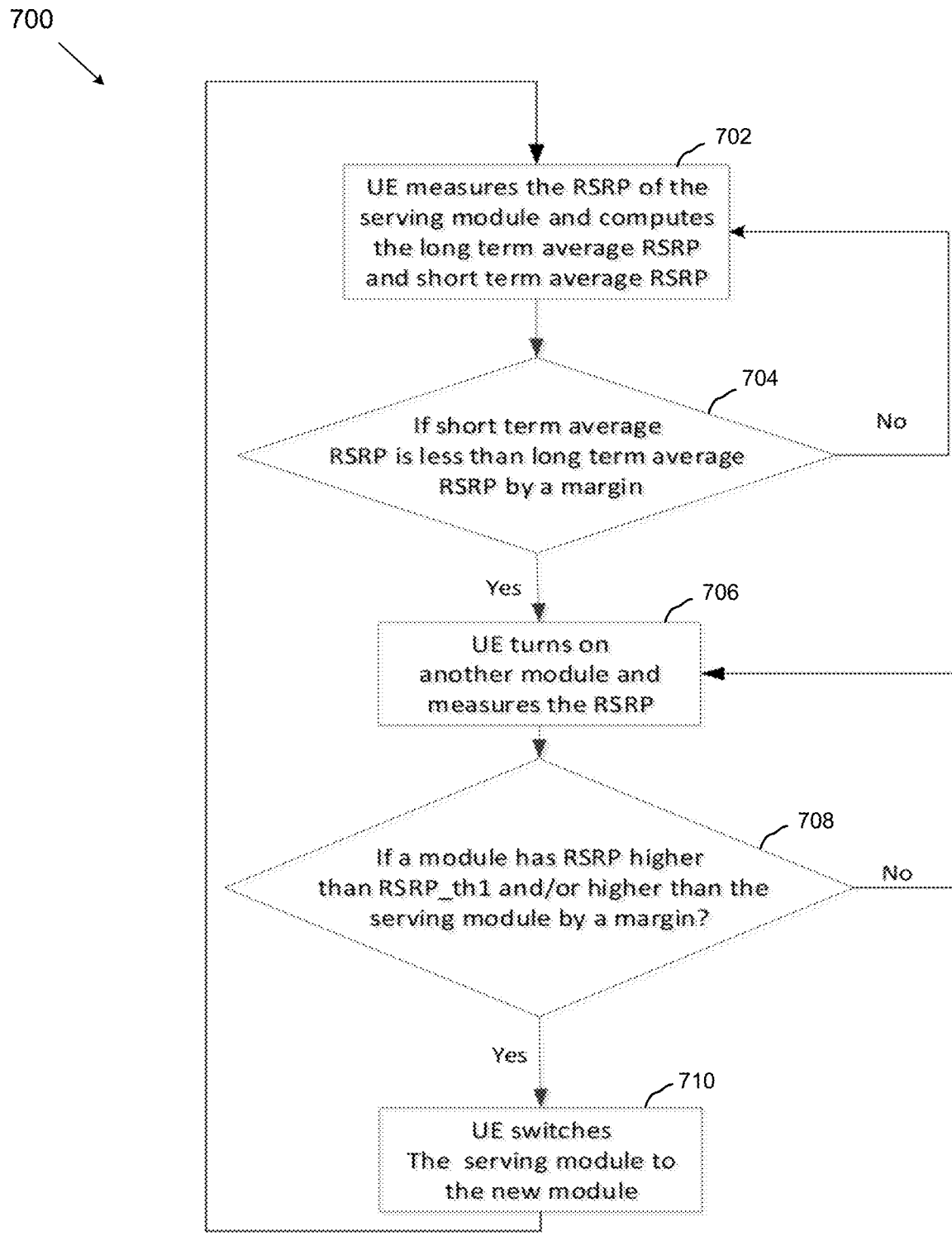
FIG. 7 illustrates a flow chart of a method for operating an electronic device according to embodiments of the present disclosure.

In another approach, the electronic device determines to measure other modules based only on short term average RSRP and long term average RSRP, as illustrated in FIG. 7. For example, if $\tilde{P}_{SM}(t)<\overline{P}_{SM}(t)+\delta'$, the electronic device starts measuring other modules. This method may work better if the RSRP measurement is very noisy and there is transient hand/body blockage.

FIG. 7 illustrates a flow chart of a method 700 for operating an electronic device, as may be performed by an electronic device such as electronic device 116, according to embodiments of the present disclosure. The embodiment of the method 700 illustrated in FIG. 7 is for illustration only. FIG. 7 does not limit the scope of this disclosure to any particular implementation.

As illustrated in FIG. 7, the method 700 begins at step 702. In step 702, the electronic device (e.g., 111-116 as illustrated in FIG. 1), measures the RSRP of the serving module and computes the long term average RSRP and the short term average RSRP.

In step 704, the electronic device determines whether the short term average RSRP is less than the long term average RSRP by a first margin. If the short term average RSRP is not less than the long term average RSRP by a first margin, then the method reverts to step 702. If the short term average RSRP is less than the long term average RSRP by a first margin, then the method proceeds to step 706.

In step 706, the electronic device turns on another module and measures the RSRP of that module.

In step 708, the electronic device determines whether the RSRP of the other module is greater than a second threshold and/or greater than the RSRP of the serving module by a second margin. If the RSRP of the other module is not greater than the second threshold and/or greater than the RSRP of the serving module by a second margin, then the method reverts to step 706. If the RSRP of the other module is greater than the second threshold and/or greater than the RSRP of the serving module by a second margin, then the method proceeds to step 710.

In step 710, the electronic device switches the serving module to the other module.

In yet another approach, the electronic device determines when to sweep modules based on multiple conditions of the current RSRP, short term average RSRP and long term average RSRP. For example, the electronic device can check two conditions. Condition 1 is $P_{SM}(t)<P_{SM}(t)+\delta$. Condition 2 is $\tilde{P}_{SM}(t)<\overline{P}_{SM}(t)+\delta'$. If one of the conditions is satisfied or both conditions are satisfied, the electronic device starts sweeping other modules.

The parameter $\delta$ and $\delta'$ adds more flexibility to these two options. By default, the parameter $\delta$ and $\delta'$ could be set as zero. Example values of $\delta$ and $\delta'$ are 0 dB, −1 dB, −3 dB. They could also be determined experimentally. The values of the parameters, including $\delta$, $\overline{\alpha}$, $\alpha$, could also depend on the module setup. For example, for a setup of two modules, the two modules could be placed on the left and right edge of the phone or on the left (or right) and the back side of the phone. For different setups, the corresponding values of the parameters can be searched.

In another embodiment, the RSRP_th1 is also determined by the recent RSRP measurement. In one approach, RSRP_th1 is set as RSRP_th0+c where c is a constant gap between the two thresholds. The value of c may be 0, or 5 dB or other numbers.

Figure 8:
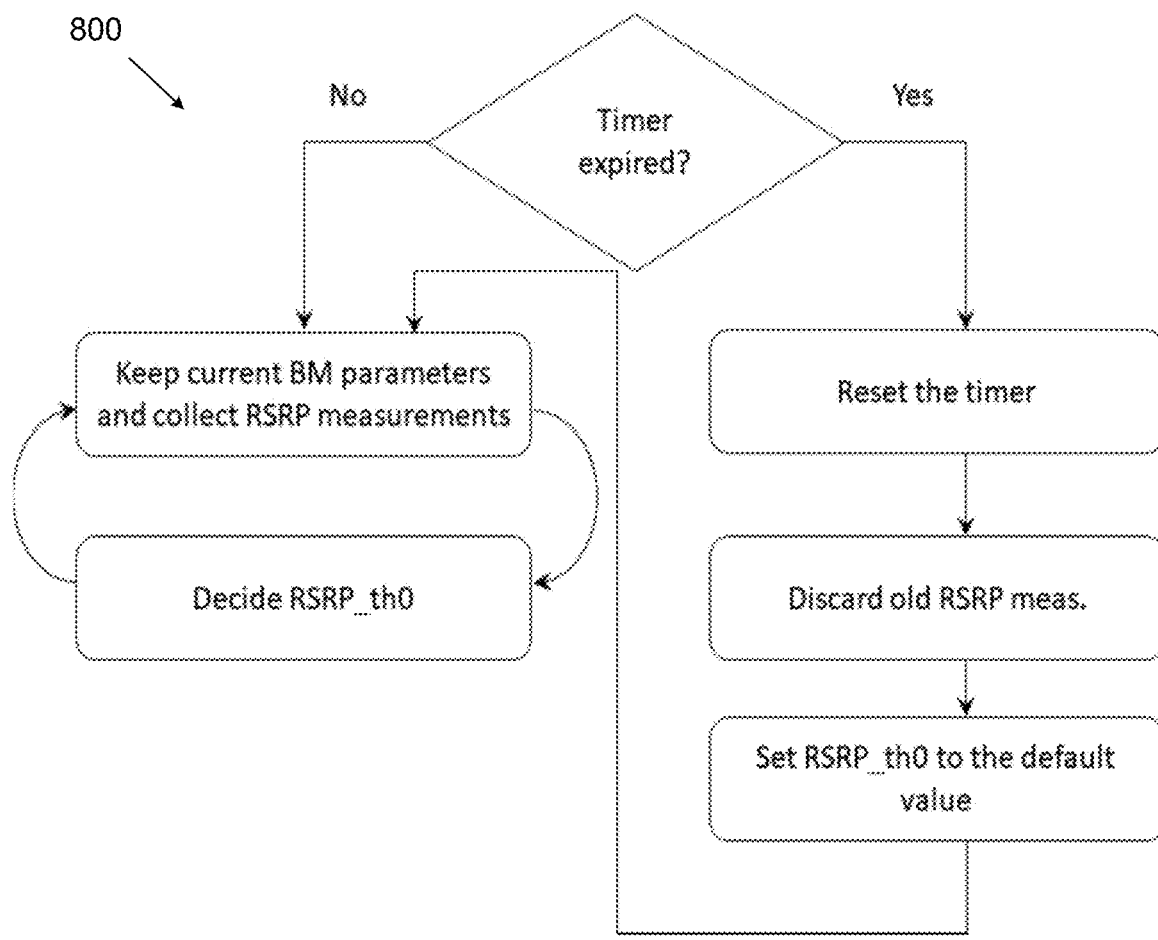
FIG. 8 illustrates a flow chart of a method for operating an electronic device according to embodiments of the present disclosure.

FIG. 8 illustrates a flow chart of a method 800 for operating an electronic device, as may be performed by an electronic device such as electronic device 116, according to embodiments of the present disclosure. The embodiment of the method 800 illustrated in FIG. 8 is for illustration only. FIG. 8 does not limit the scope of this disclosure to any particular implementation.

As illustrated in FIG. 8, the electronic device decides the RSRP_th0 based on the CDF of the current measured RSRP. Specifically, during the operation, the electronic device uses the measured RSRP values to construct a numerical CDF estimate. Then the electronic device can decide the RSRP_th0 to be at a certain percentile, e.g., 90th percentile of the CDF, or the minimum between the 90th percentile of the CDF and the RSRP required for the highest Modulation and Coding Scheme (MCS) supported by the system. This permits the BM operation close to the highest RSRP, resulting in high throughput performance. This method, however, has two problems that need to be addressed. First, this method creates a loop between deciding the RSRP_th0 and collecting the RSRP measurements. That is to say that collected RSRP measurements are used to decide RSRP_th0, whereas the selection of RSRP_th0 determines what/how the measurements are collected. The second problem is that the RSRP measurements used to calculate the current empirical estimate of the CDF, and hence used in calculating the 90th percentile, are not outdated.

As illustrated in FIG. 8, if the timer is currently running, operation in the normal mode continues, i.e., collecting the RSRP measurements that are in turn used to decide the RSRP_th0. If, however, the timer is expired, the timer is reset, and the old measurements are discarded. Once the old measurements are discarded, the RSRP_th0 is determined. For this purpose, there can be a default value of RSRP_th0. The default value of RSRP_th0 can be a suitably large value that ensures high throughput, though this will be at the expense of increased sweeping rate. The default value can be determined based on the RSRP required for highest MCS supported by the system. Based on this default RSRP_th0 value, the RSRP collection process starts again and based on the collected RSRP values afresh, the RSRP_th0 can then be more accurately decided.

In yet another embodiment, the electronic device keeps the RSRP measurements in a first in first out (FIFO) buffer. The finite length of the buffer ensures that the old RSRP measurements that are no longer relevant are automatically discarded. The length of the buffer, however, can be determined based on the current operating conditions. If the collected RSRP measurements have high variance across time, then the buffer length can be reduced as the measurements collected in the past will become outdated quickly. Similarly, if the collected RSRP measurements have low variance, then the buffer length can be increased to collect a large number of RSRP measurements in order to get a more reliable numerical CDF estimate.

In one embodiment, the serving module RSRP is clipped if it is too high. This is to take into account the realistic modulation and coding scheme (MCS) supported by the communication system. Mathematically, the RSRP of the serving module at time t is set as min($P_{SM}$(t), Clipping threshold). In other words, if the RSRP of the serving module is too high and larger than the clipping threshold, it can be set as the clipping threshold. The short term and long term average RSRP is computed accordingly based on the RSRP as determined by aforementioned min operation that produces either the original serving RSRP or the clipped serving module RSRP.

In a typical mmWave communication scenario, the clipping threshold can be around −90 dBm to −70 dBm, depending on the bandwidth, electronic device noise figure, and the highest MCS supported. The clipping threshold can be fixed or predetermined according to the target or known network configuration and electronic device receiver performance. The clipping threshold can also be a function of system parameters, including one or more of the system bandwidth configured by the network to the electronic device, the supported highest MCS by the network and the electronic device, the highest SNR/SINR attainable and the electronic device receiver performance indicator such as the electronic device noise figure.

1. In one example, the clipping threshold function can be written as Clipping threshold=W*$N_0$+Noise figure+SNR requirement for peak MCS
   W: bandwidth, for example, 100 MHz.
   $N_0$=kT: the thermal noise spectral density, where k is Boltzmann's constant in joules per kelvin, and T is the receiver system noise temperature in kelvins.
   Noise figure: the noise figure at the electronic device, the typical value is between 9 dB to 15 dB for mmWave band.
   SNR requirement for peak MCS: 30 dB if the QAM 256 is the highest MCS supported.
2. In another example, the clipping threshold can be determined based on a mapping table, mapping the system parameters' values to the clipping threshold. An example mapping table is given in Table 1.

TABLE 1

An example mapping table from system parameters to the clipping threshold

| System Bandwidth | UE Noise Figure | Supported highest MCS level | ... | Clipping threshold |
|---|---|---|---|---|
| 20 MHz | 9 dB | 64 QAM | ... | −90 dBm |
| 100 MHz | 11 dB | 256 QAM | ... | −82 dBm |
| 200 MHz | 15 dB | 256 QAM | ... | −75 dBm |
| ... | ... | ... | ... | ... |

In another embodiment, the device could have access to position information either from the cellular position service provided by the network or from some other third party service such as the global positioning system. The module sweeping behavior may be controlled by a set of parameters which may include but not limited to RSRP_th0, RSRP_th1. In this embodiment, these parameters are stored in device's memory or easily accessible at the network. The parameters may be stored in a table-like structure indexed by the position, which could be defined to be grids of a certain size.

In one implementation, only the long term average signal strength $\overline{P}_{SM}(p)$ may be computed using an equation similar to what was shown earlier, but instead of averaging across time, the measurements at some location index p are collected and input into the formula. In this case, each entry in the table corresponds to some location p, and it contains the long term average signal strength at that location. When the device is determined to be in the location, it could query the table to obtain the long term average signal strength $\overline{P}_{SM}(p)$, which may be used to determine an RSRP for the module sweeping such as RSRP_th0. Note that this table maybe updated using one of the moving average as described earlier, whenever the device is determined to be at the location and new signal strength measurements become available. An example table is shown in Table 2.

In another implementation, successful parameter choices (for example from using the various methods as described in this disclosure) are saved in the table indexed by the location. When the device is determined to be at the location, electronic device query the table to obtain the parameter set to be used at that location.

TABLE 2

An example table saving the long term average signal strength of different positions

| Serving cell | Position index p | long term average signal strength $\overline{P}_{SM}$ (p) | ... |
|---|---|---|---|
| Cell ID = 1 | p = 1 | $\overline{P}_{SM}$ (1) = −100 dBm | ... |
| Cell ID = 1 | p = 2 | $\overline{P}_{SM}$ (2) = −70 dBm | ... |
| Cell ID = 2 | p = 1 | $\overline{P}_{SM}$ (1) = −95 dBm | |
| ... | ... | ... | ... |

In one embodiment, the electronic device triggers a module sweeping operation if the estimated angle of arrival is on the edge (or outside) of the spherical coverage region of the serving module.

In one embodiment, the angle of arrival can be estimated based on the measured RSRP of the serving module. The estimate could be done by maximum likelihood estimation, or particle filter method. If the electronic device is not rotating quickly, the estimated angle of arrival could be accurate enough since the RSRP delay is not a big issue in this case.

Assume that the radiation pattern of Beam n is given by $G_n(\theta, \phi)$, and the RSRP measurement of Beam n is $RSRP_n$. The maximum likelihood estimation of the angle of arrival is, $$(\hat{\theta}, \hat{\phi}) = \mathrm{argmin}_{(\theta,\phi)} \min_C \sum_n (RSRP_n - G_n(\theta, \phi) - C)^2 = \mathrm{argmin}_{(\theta,\phi)} \mathrm{Var}(RSRP_n - G_n(\theta, \phi))$$

The logic behind the above maximum likelihood estimation is the assumption of single-path channel and Gaussian distributed RSRP measurement error. The variable C represents the received power by an isotropic electronic device.

The spherical coverage region of each module can be determined by calculating the beamforming gain of each beam at the sampled directions on the unit-sphere. For a given direction, if the beam achieving the largest beamforming gain belongs to the serving module, then the given direction falls in the spherical coverage region of that serving module. Mathematically, the coverage region of Beam k is defined as a set of directions as follows.

$$S_k = \{(\theta, \phi) | k = \mathrm{argmax}_n G_n(\theta, \phi)\}$$

And the coverage region of the i-th module is defined as, $$R_i = \{S_k | \text{Beam } k \text{ is associated with Module } i\}$$

The spherical coverage regions could be irregular and not clearly divided among modules, which makes it difficult to decide the edge of the spherical coverage region.

Figure 9:
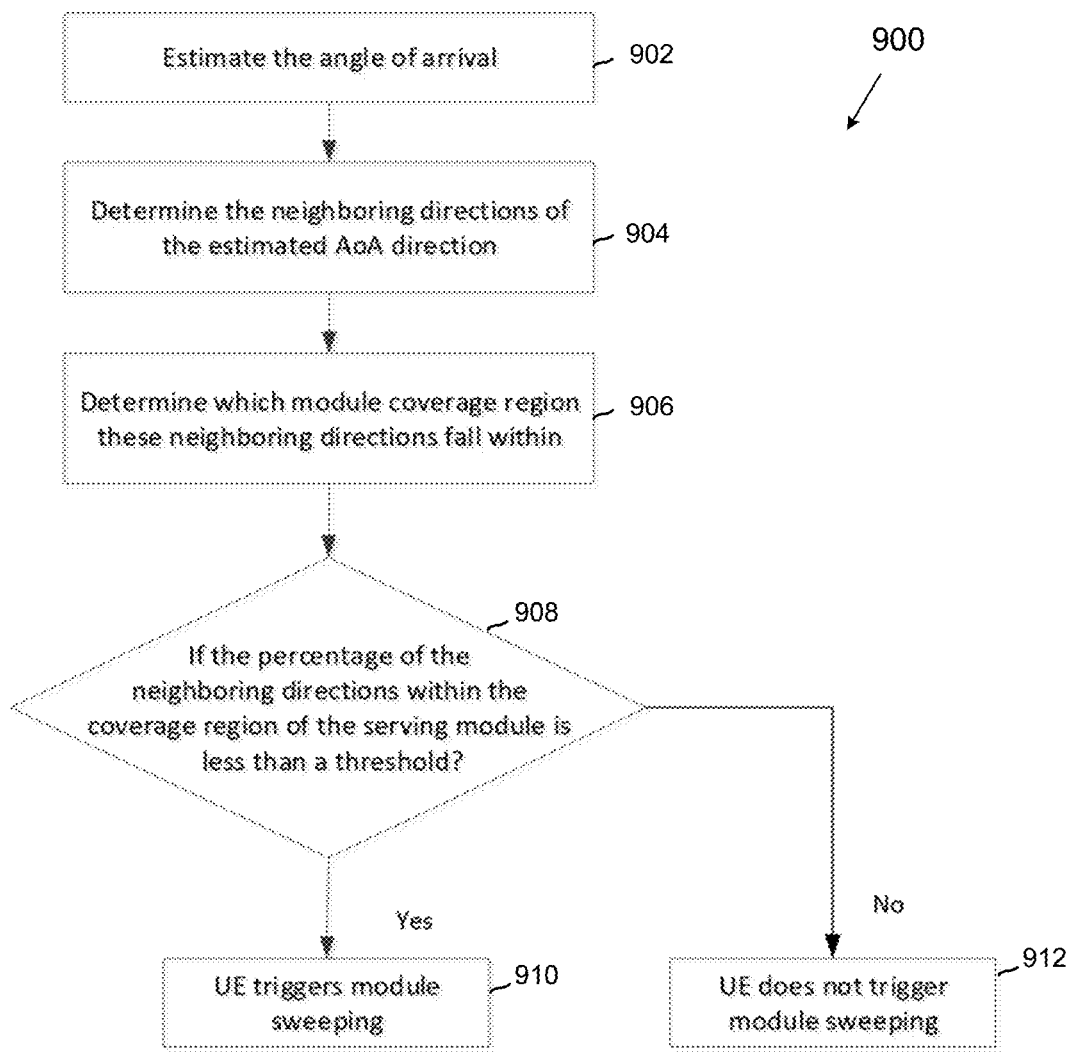
FIG. 9 illustrates a flow chart of a method for operating an electronic device according to embodiments of the present disclosure.

In one approach illustrated in FIG. 9, whether a direction is at the edge of the spherical coverage region of the serving module is determined by the module association of the neighing directions. The neighboring directions can be sampled from a spherical region which is surrounding the angle of arrival estimation. For example, the angle of the neighboring directions with the estimated angle of arrival is less than 20 degrees. If minority (or none) of these neighboring directions are within the coverage region of the serving module, the direction is declared as the edge (or outside) of the coverage region. The minority threshold could be, for example, 60%. That is, if less than 60% of the neighboring points are within the coverage region of the serving module, the angle of arrival is deemed as on the edge or outside the serving module coverage region, and the electronic device triggers the module sweeping.

FIG. 9 illustrates a flow chart of a method 900 for operating an electronic device, as may be performed by an electronic device such as electronic device 116, according to embodiments of the present disclosure. The embodiment of the method 900 illustrated in FIG. 9 is for illustration only. FIG. 9 does not limit the scope of this disclosure to any particular implementation.

As illustrated in FIG. 9, the method 900 begins at step 902. In step 902, the electronic device (e.g., 111-116 as illustrated in FIG. 1), estimates the angle of arrival of a beam.

In step 904, the electronic device determines the neighboring directions of the estimated angle of arrival direction.

In step 906, the electronic device determines which module coverage region the neighboring directions fall within.

In step 908, the electronic device determines whether the percentage of the neighboring directions within the coverage region of the serving module is less than a threshold. If the percentage of the neighboring directions within the coverage region of the serving module is not less than the threshold, then in step 910, the electronic device does not trigger the module sweeping operation. If the percentage of the neighboring directions within the coverage region of the serving module is less than the threshold, then in step 912, the electronic device triggers the module sweeping operation.

In another embodiment, the electronic device triggers the module sweeping if the estimated angle of arrival is moving outside the spherical coverage region of the serving module. The electronic device monitors the trajectory of the angle of arrival on the sphere and checks whether it is moving inside or it is moving towards the edge and outside the coverage region. For this method, the electronic device has to save the history of the estimated angle of arrival.

In yet another embodiment, electronic device determines the priority of the modules based on the angle of arrival estimation.

1. In one approach, the electronic device determines the module sweeping order based on the distance of the estimated angle of arrival and the coverage region of the module. In the case that there are more than two modules mounted on the phone, the angle of arrival estimation provides the electronic device a hint which module is more likely to be the best module. The module with the coverage region containing the estimated angle of arrival or closest to estimated angle of arrival should be swept first, if the electronic device wants to reduce the module sweeping latency and stop in the middle of the full module sweeping.
2. In the second approach, the electronic device selects the module based on the angle of arrival estimation if the module sweeping does not provide a clear choice about the best module. If the module sweeping results in two candidate modules with the same or similar RSRP values, the module with a coverage region containing the estimated angle of arrival or closest to estimated angle of arrival should be selected, since it is more likely to be the true best module.

The IMU sensor outputs, if available and accessible, can be used to make the decision of module sweeping.

In one embodiment, if the electronic device orientation changes significantly in a short time, a module sweeping should be done. For example, if the IMU sensor indicates the electronic device just changes from portrait module to landscape module, or vice versa, the electronic device could trigger the module sweeping to find a new serving module.

In another embodiment, the electronic device could predict the best module based on the RSRP measurement of the serving module and the electronic device rotation angle. For example, the angle of arrival before the electronic device rotation can be estimated with a RSRP measurement of the serving module. Based on the angle of arrival estimation and the electronic device rotation, the electronic device can predict the angle of arrival after the electronic device rotation. Then the electronic device can predict the best module and give high priority to the predicted best module in the beam sweeping, for example, sweep this module first, or select this module if there is no clear winner from the RSRP measurements, as illustrated in FIG. 10.

Figure 10:
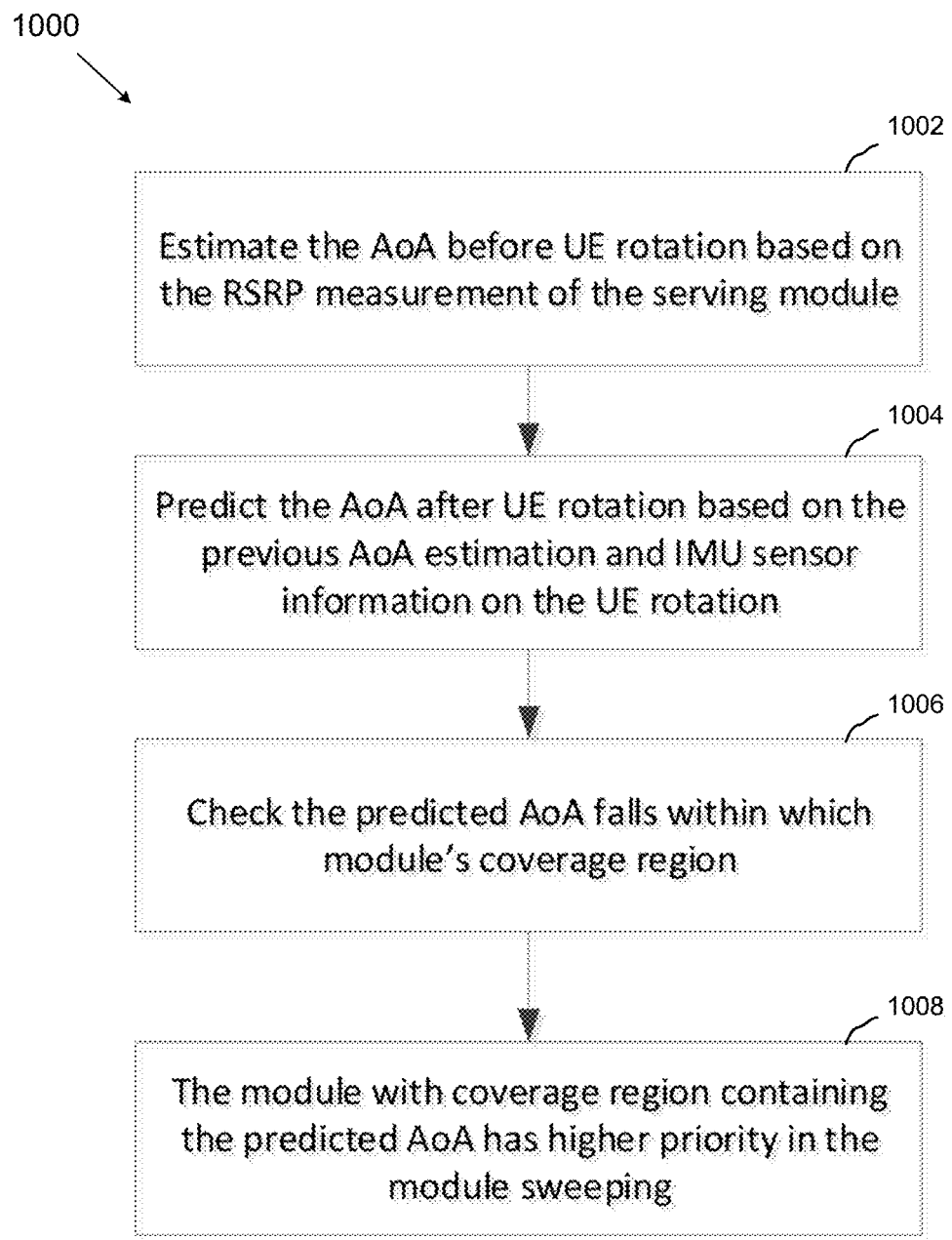
FIG. 10 illustrates a flow chart of a method for operating an electronic device according to embodiments of the present disclosure.

FIG. 10 illustrates a flow chart of a method 1000 for operating an electronic device, as may be performed by an electronic device such as electronic device 116, according to embodiments of the present disclosure. The embodiment of the method 1000 illustrated in FIG. 10 is for illustration only. FIG. 10 does not limit the scope of this disclosure to any particular implementation.

As illustrated in FIG. 10, the method 1000 begins at step 1002. In step 1002, the electronic device (e.g., 111-116 as illustrated in FIG. 1), estimates the angle of arrival of a beam before electronic device rotation based on the RSRP measurement of the serving module.

In step 1004, the electronic device predicts the angle of arrival of the beam after electronic device rotation based on the previous angle of arrival estimation and IMU sensor information on the electronic device rotation.

In step 1006, the electronic device checks which module's coverage region the predicted angle of arrival falls within.

In step 1008, the electronic device determines that the module with the coverage region containing the predicted angle of arrival has a higher priority in the module sweeping operation.

In yet another embodiment, the electronic device tracks the angle of arrival changing based on the RSRP measurement and the IMU sensor measurement on the electronic device orientation. Various methods could be adopted. For example, the particle filter method, which uses a set of particles to represent the posterior distribution of some stochastic process given noisy observations, RNN (recurrent neural network), which is used to predict the future based on the sequence observed before.

Figure 11:
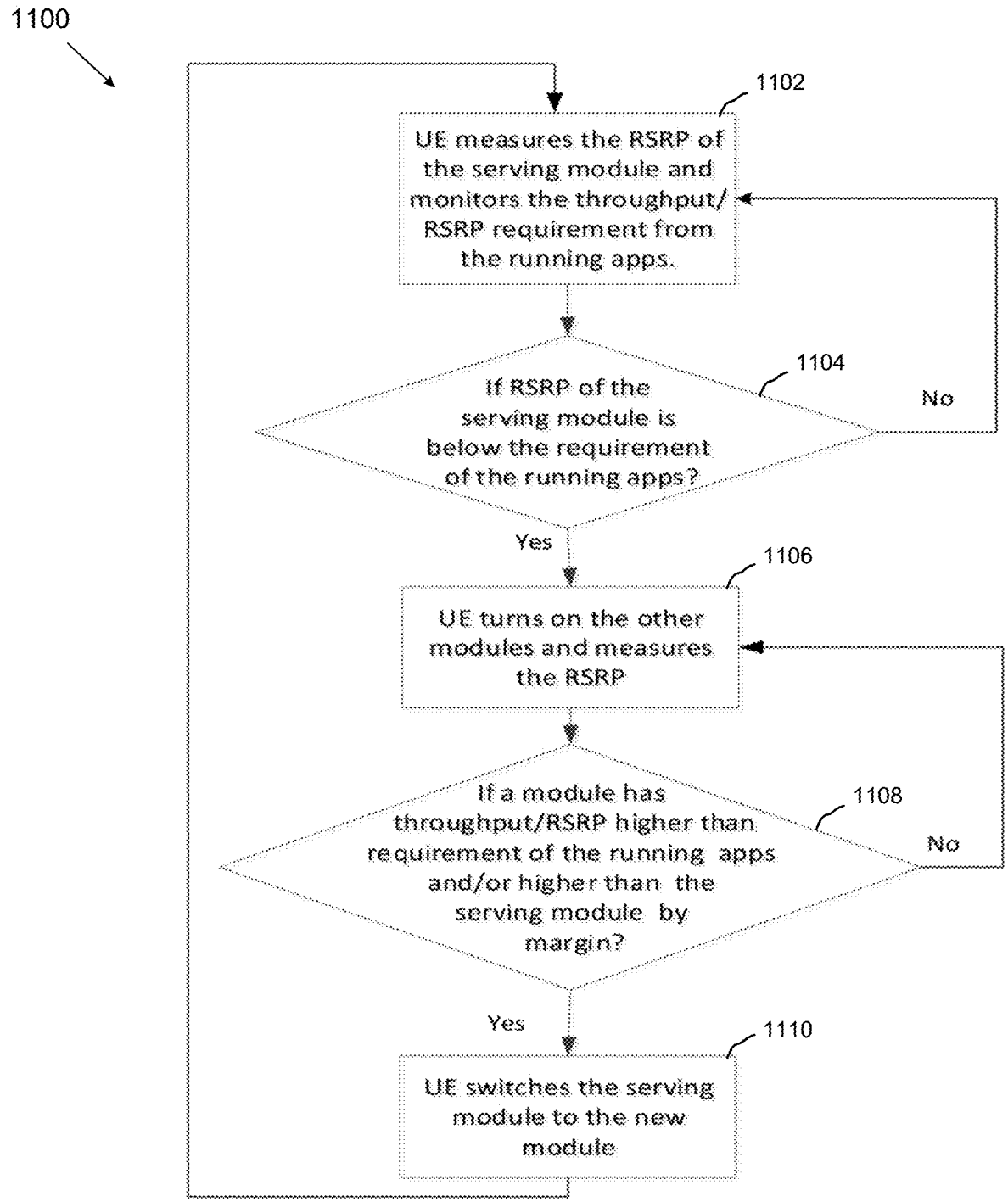
FIG. 11 illustrates a flow chart of a method for operating an electronic device according to embodiments of the present disclosure.

In another embodiment, the electronic device could adapt the beam operation parameters based on data requirement of the electronic device. If the electronic device is running an app (or several apps) requiring high throughput/RSRP, the electronic device may choose beam operation parameters to achieve higher throughput/RSRP and deprioritize power saving. On the other hand, if it is not running apps requiring high throughput/RSRP, the electronic device may choose beam operation parameters to reduce the module sweeping rate while maintaining a minimal throughput/RSRP and save power. As illustrated in FIG. 11, the electronic device compares the required throughput/RSRP with the current throughput/RSRP of the serving module and decides whether to start module sweeping.

FIG. 11 illustrates a flow chart of a method 1100 for operating an electronic device, as may be performed by an electronic device such as electronic device 116, according to embodiments of the present disclosure. The embodiment of the method 1100 illustrated in FIG. 11 is for illustration only. FIG. 11 does not limit the scope of this disclosure to any particular implementation.

As illustrated in FIG. 11, the method 1100 begins at step 1102. In step 1102, the electronic device (e.g., 111-116 as illustrated in FIG. 1), measures the RSRP of the serving module and monitors the throughput/RSRP requirement from running apps.

In step 1104, the electronic device determines whether the RSRP of the serving module is below the requirement of the running apps. If the RSRP of the serving module is not below the requirement of the running apps, the method reverts to step 1102. If the RSRP of the serving module is below the requirement of the running apps, the method proceeds to step 1106.

In step 1106, the electronic device turns on the other modules and measures the RSRP.

In step 1108, the electronic device determines whether a new module has throughput/RSRP higher than the requirement of the running apps and/or higher than the serving module by a margin. If the module does not have throughput/RSRP higher than the requirement of the running apps and/or higher than the serving module by a margin, the method reverts to step 1106. If the module has throughput/RSRP higher than the requirement of the running apps and/or higher than the serving module by a margin, the method proceeds to step 1110.

In step 1110, the electronic device switches to the new module.

The throughput requirement could be converted to the RSRP requirement by various methods. For example, the Shannon data rate formula can be adopted. In another example, a mapping table between the throughput and RSRP can be generated based on the experiments and can be used to map the throughput requirement to RSRP requirement.

In yet another embodiment, the electronic device could determine module sweeping based on the average throughput/RSRP from the physical layer and the app requirement from the higher layer. In one approach, the electronic device could compute the average throughput/RSRP of serving module and compare it with required throughput/RSRP in the near future. If the average throughput/RSRP of serving module is less than the expected requirement in the near future, a module sweeping is done in advance to find a better module. The average throughput/RSRP could be the exponentially filtered throughput/RSRP. The throughput/RSRP required by the apps in the near future could be obtained from an app or estimated based on the app usage history as illustrated in FIG. 12.

Figure 12:
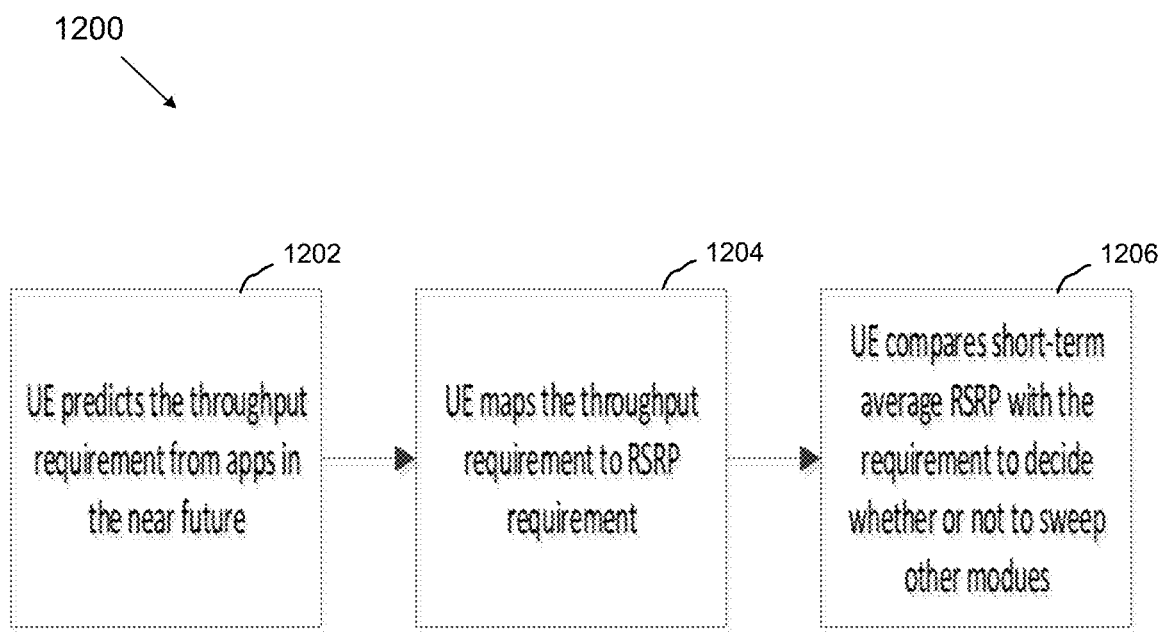
FIG. 12 illustrates a flow chart of a method for operating an electronic device according to embodiments of the present disclosure.

FIG. 12 illustrates a flow chart of a method 1200 for operating an electronic device, as may be performed by an electronic device such as electronic device 116, according to embodiments of the present disclosure. The embodiment of the method 1200 illustrated in FIG. 12 is for illustration only. FIG. 12 does not limit the scope of this disclosure to any particular implementation.

As illustrated in FIG. 12, the method 1200 begins at step 1202. In step 1202, the electronic device (e.g., 111-116 as illustrated in FIG. 1), predicts the throughput requirement from apps in the near future.

In step 1204, the electronic device maps the throughput requirement to RSRP requirement.

In step 1206, the electronic device compares the short term average RSRP with the requirement to decide whether or not to sweep other modules.

Figure 13:
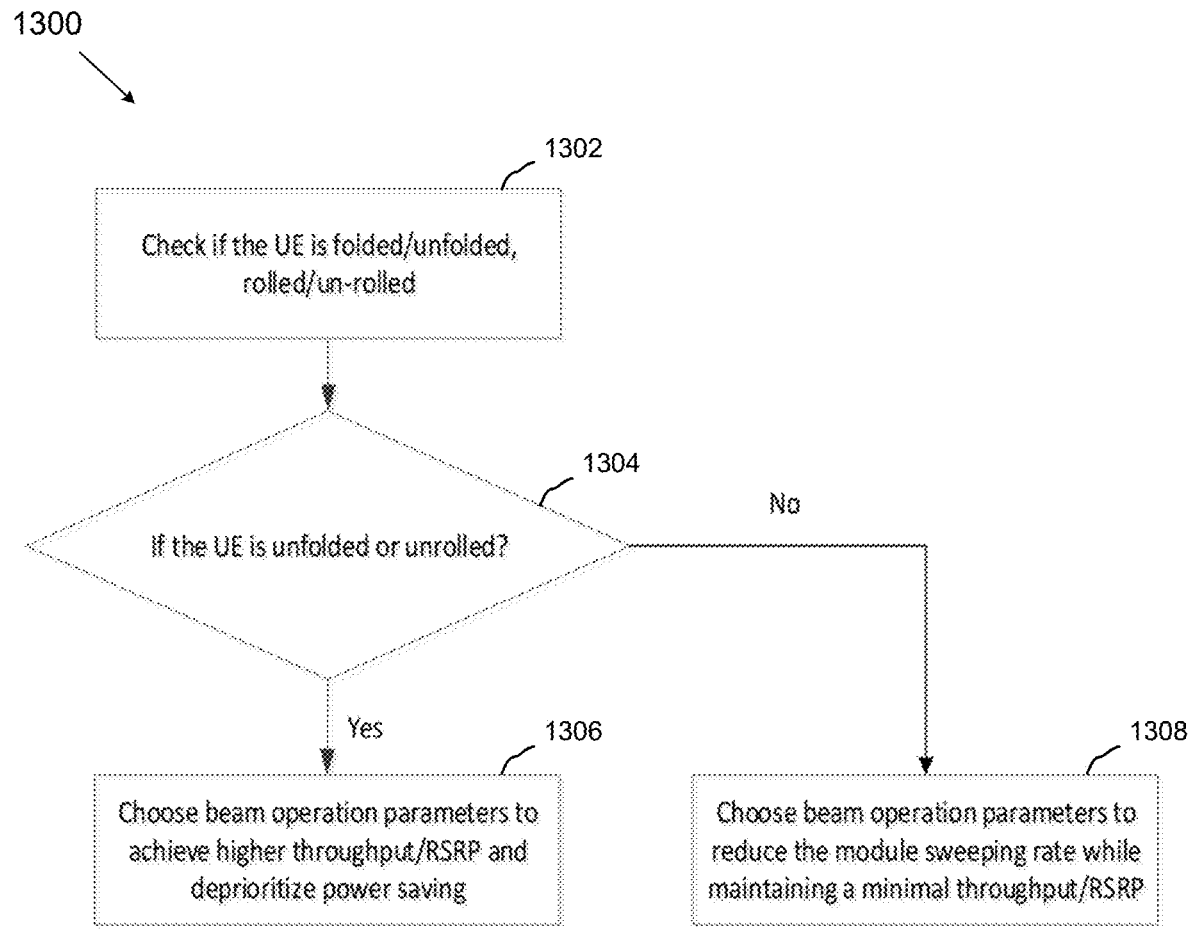
FIG. 13 illustrates a flow chart of a method for operating an electronic device according to embodiments of the present disclosure.

In another embodiment as illustrated in FIG. 13, the electronic device could adapt the beam operation parameters based on the form factor status of the electronic device. (e.g., folded/un-folded, rolled/un-rolled, etc.) If the electronic device is un-folded (or un-rolled), the electronic device may choose beam operation parameters to achieve higher throughput/RSRP and deprioritize power saving. On the other hand, if it is folded/(or rolled), the electronic device may choose beam operation parameters to reduce the module sweeping rate while maintaining a minimal throughput/RSRP and save power. The electronic device may predict (or determine) the throughput requirement from the status of the electronic device in the near future. The electronic device may map the throughput requirement to the RSRP requirement. The electronic device may compare the short-term average RSRP with the requirement to decide whether or not to sweep other modules.

FIG. 13 illustrates a flow chart of a method 1300 for operating an electronic device, as may be performed by an electronic device such as electronic device 116, according to embodiments of the present disclosure. The embodiment of the method 1300 illustrated in FIG. 13 is for illustration only. FIG. 13 does not limit the scope of this disclosure to any particular implementation.

As illustrated in FIG. 13, the method 1300 begins at step 1302. In step 1302, the electronic device (e.g., 111-116 as illustrated in FIG. 1), checks whether the electronic device is folded/unfolded or rolled/unrolled.

In step 1304, the electronic device determines whether the electronic device is unfolded or unrolled. If the electronic device is not unfolded or unrolled, the method proceeds to step 1306 and the electronic device chooses beam operation parameters to reduce the module sweeping rate while maintaining a minimal throughput/RSRP. If the electronic device is unfolded or unrolled, the method proceeds to step 1308 and the electronic device chooses beam operation parameters to achieve higher throughput/RSRP and deprioritizes power saving.

Figure 14:
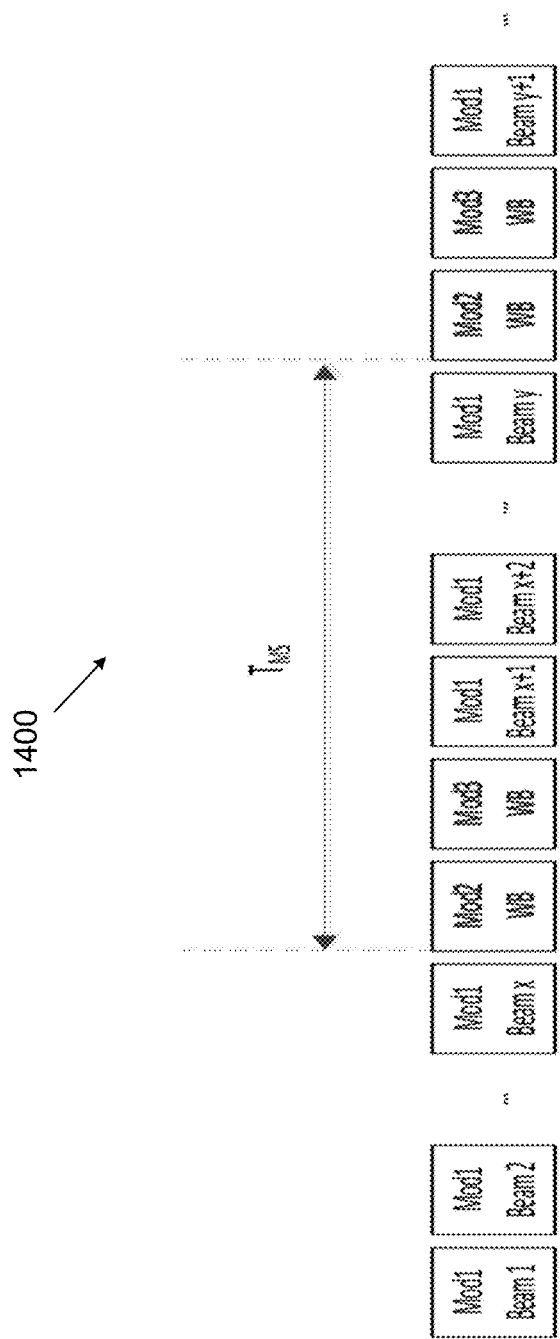
FIG. 14 illustrates an example of periodic module sweeping according to embodiments of the present disclosure.

In one embodiment as illustrated in FIG. 14, the electronic device is sweeping the modules periodically.

FIG. 14 illustrates an example of periodic module sweeping 1400 as may be performed by an electronic device such as electronic device 116, according to embodiments of the present disclosure. The embodiment of the periodic module sweeping 1400 illustrated in FIG. 14 is for illustration only. FIG. 14 does not limit the scope of this disclosure to any particular implementation.

FIG. 14 shows an example where an electronic device with three antenna modules sweeps the modules periodically with period $T_{MS}$. The period, $T_{MS}$, could be adjusted dynamically to achieve a good trade-off between less sweeping and high RSRP/throughput performance.

In one embodiment, the electronic device reduces the module sweeping period if a sudden drop of the RSRP is detected. The detection of sudden drop of RSRP can be done as described above where the instantaneous RSRP, short-term average RSRP and long-term average RSRP are used to detect the drop of RSRP.

In another embodiment, the electronic device increases the module sweeping period if the RSRP is stable in the recent measurements. For example, the short-term average RSRP is close to the long-term average RSRP.

In one embodiment, the electronic device reduces the module sweeping period if the estimated angle of arrival is on the edge (or outside) of the spherical coverage region of the serving module.

In another embodiment, the electronic device increases the module sweeping period if the estimated angle of arrival is around the center of the spherical coverage region of the serving module.

In another embodiment, the electronic device reduces the module sweeping rate if the electronic device is rotating quickly, and increases it if the electronic device is not rotating or rotating slowly.

In yet another embodiment, the electronic device reduces the module sweeping period if the electronic device is unfolded or unrolled, and increases it if the electronic device is folded or rolled.

The conditions of reducing/increasing the module sweeping period is summarized in Table 3.

There could be lower and upper bounds for the module sweeping period and the dynamic adjustment is limited within these bounds.

TABLE 3

The conditions of reducing/increasing the module sweeping period

| Conditions of reducing the module sweeping period | Conditions of increasing the module sweeping period |
|---|---|
| 1. A sudden drop of the RSRP is detected | 1. The RSRP is stable in the recent measurements |
| 2. Estimated AoA is on the edge (or outside) of the spherical coverage region of the serving module. | 2. Estimated AoA is around the spherical coverage center of the serving module |
| 3. UE is rotating quickly | 3. UE is not rotating or rotating slowly |
| 4. UE is unfolded or unrolled | 4. UE is folded or rolled |

Figure 15:
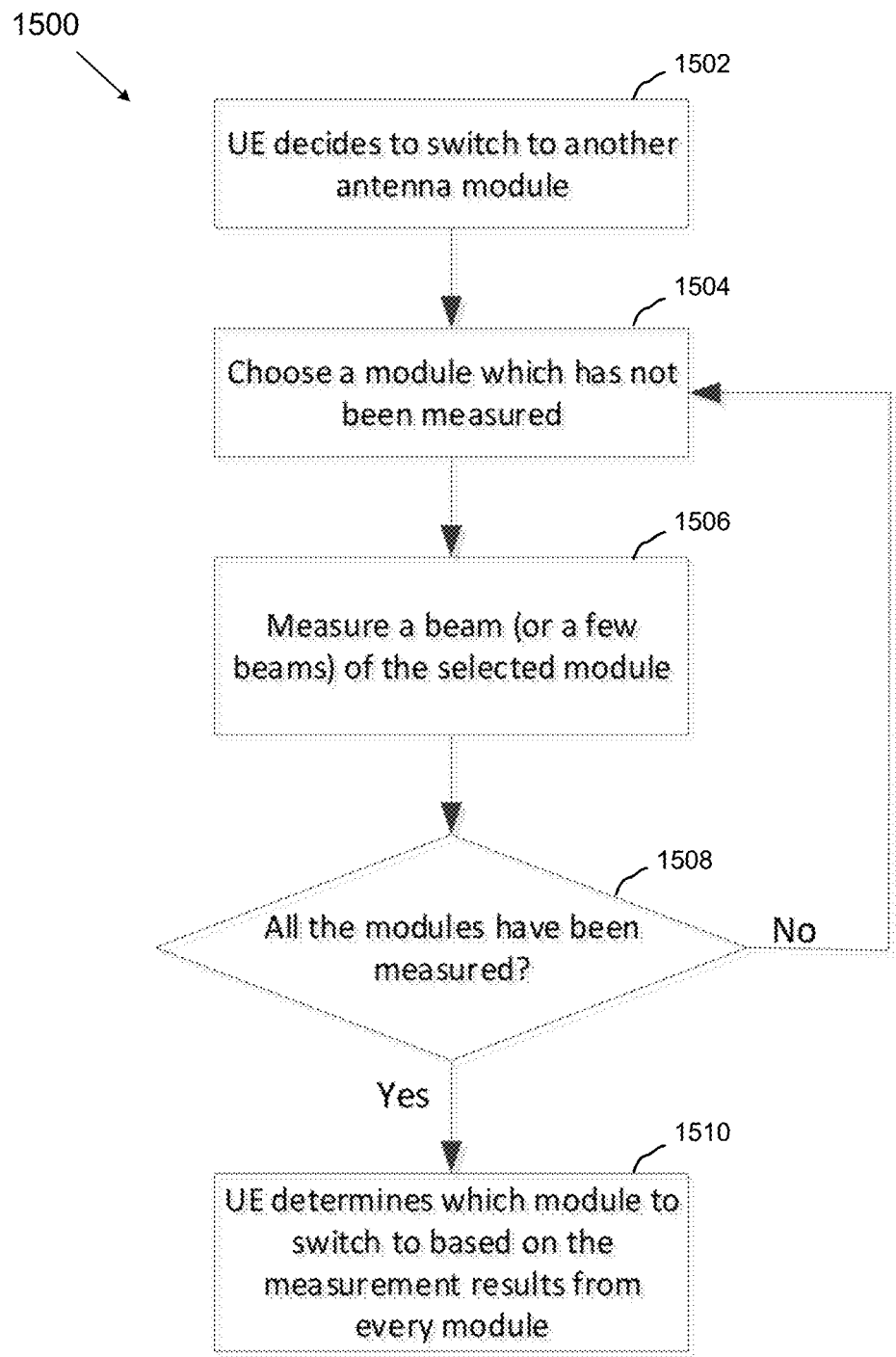
FIG. 15 illustrates a flow chart of a method for operating an electronic device according to embodiments of the present disclosure.

As described above, if the electronic device moves/rotates or the channel changes or the temperature of the current antenna module is too high, the electronic device may choose to switch to another antenna module to maintain a good connection with the BS and/or control the temperature. To find out which antenna module is suitable for communication, a module sweeping operation may be performed, as illustrated in FIG. 15. A beam (or a few beams) from each module is activated to measure the channel quality, for example, received signal reference power (RSRP). After the full sweeping of all the modules, the electronic device determines which module to switch to based on the measurement results. In one embodiment, the modules are activated sequentially.

FIG. 15 illustrates a flow chart of a method 1500 for operating an electronic device, as may be performed by an electronic device such as electronic device 116, according to embodiments of the present disclosure. The embodiment of the method 1500 illustrated in FIG. 15 is for illustration only. FIG. 15 does not limit the scope of this disclosure to any particular implementation.

As illustrated in FIG. 15, the method 1500 begins at step 1502. In step 1502, the electronic device (e.g., 111-116 as illustrated in FIG. 1), determines to switch to another antenna module.

In step 1504, the electronic device chooses a module which has not been measured.

In step 1506, the electronic device measures a beam (or a few beams) of the selected module.

In step 1508, the electronic device determines whether all of the modules have been measured. If all of the modules have not been measured, then the method reverts to step 1504. If all of the modules have been measured, then the method proceeds to step 1510.

In step 1510, the electronic device determines which module to switch to based on the measurement results from every module.

In one embodiment, the module sweeping operation is done only over a subset of antenna modules. For example, if the electronic device decides to switch to another module for data/control exchanging with the BS, a subset of the antenna modules are selected for measurements. Then one or more beams from each module within the subset is activated sequentially for channel measurement. Finally, the electronic device decides to switch to the best channel to exchange data/control with BS. The determination of the subset of modules to measure can be fixed or adaptive.

Figure 16:
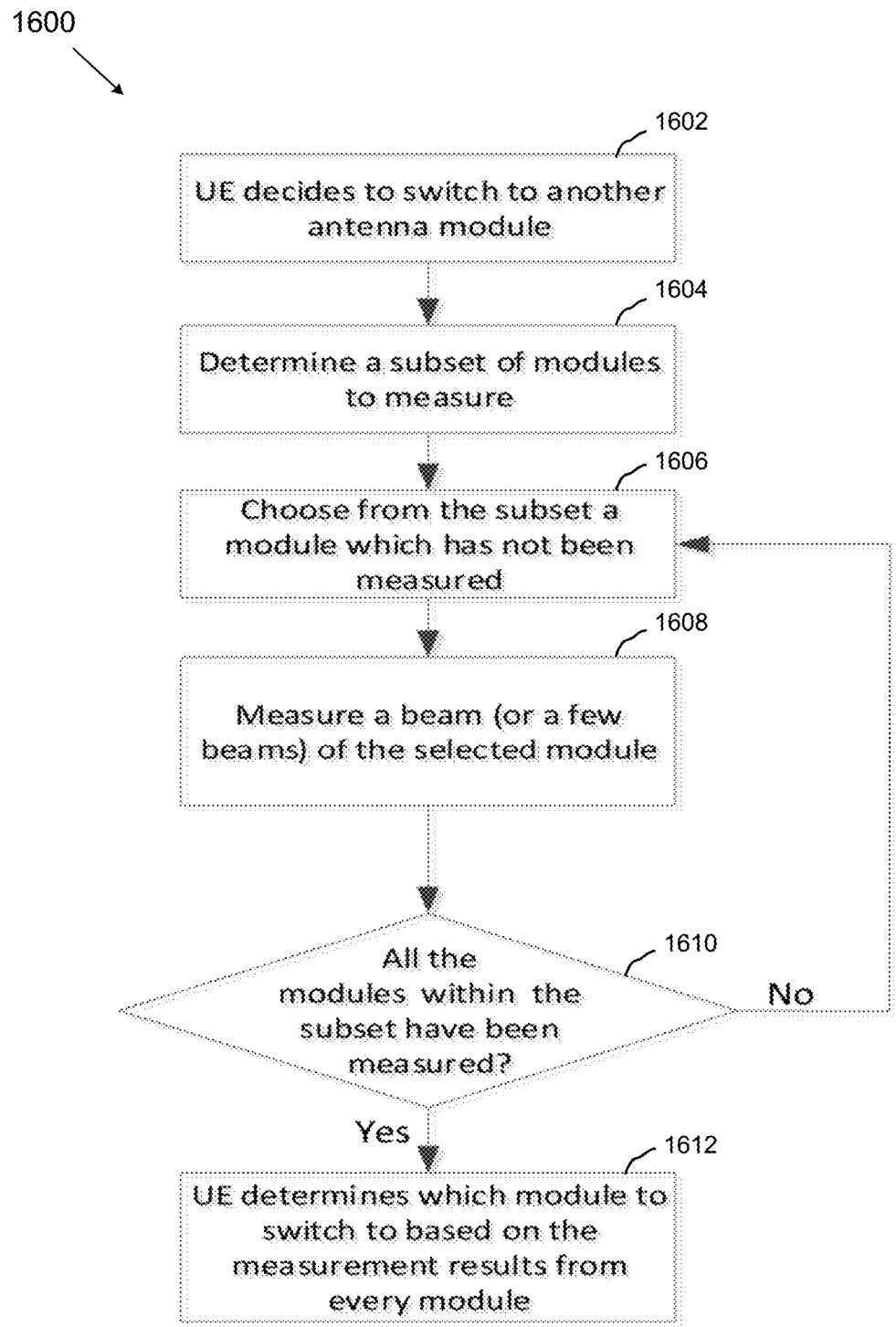
FIG. 16 illustrates a flow chart of a method for operating an electronic device according to embodiments of the present disclosure.

FIG. 16 illustrates a flow chart of a method 1600 for operating an electronic device, as may be performed by an electronic device such as electronic device 116, according to embodiments of the present disclosure. The embodiment of the method 1600 illustrated in FIG. 16 is for illustration only.

FIG. 16 does not limit the scope of this disclosure to any particular implementation. In one embodiment, the modules are activated sequentially.

As illustrated in FIG. 16, the method 1600 begins at step 1602. In step 1602, the electronic device (e.g., 111-116 as illustrated in FIG. 1), determines to switch to another antenna module.

In step 1604, the electronic device determines a subset of modules to measure.

In step 1606, the electronic device chooses a module from the subset which has not been measured.

In step 1608, the electronic device measures a beam (or a few beams) of the selected module.

In step 1610, the electronic device determines whether all of the modules within the subset have been measured. If all of the modules within the subset have not been measured, then the method reverts to step 1606. If all of the modules have been measured, then the method proceeds to step 1612.

In step 1612, the electronic device determines which module to switch to based on the measurement results from every module.

In one embodiment, the choice of the antenna module subset is adaptive. In one approach, if the electronic device has an estimation about the channel quality for some antenna modules before actually activating those modules for measurement, it can configure the subset (and the associated measurement beams) as the antenna modules which are likely to provide better measurement results.

In one approach, the channel quality predication may be based on the historical record of RSRP/RSRQ/SINR, the electronic device orientation information from the inertial measurement unit sensors, the electronic device location information from GPS, etc. For example, if a module is the second best module in the last module sweeping, it might be included in the subset for the upcoming sweeping, as long as the last module sweeping is not too outdated.

In another approach, if the electronic device is triggered to switch the module, the electronic device can first perform beam measurement of the serving module, and infer the subset of modules who have better channel quality. The beam beamforming towards the spherical coverage region of the other modules may be chosen for measurement, thus providing an estimation of the channel quality of the other modules.

Figure 17:
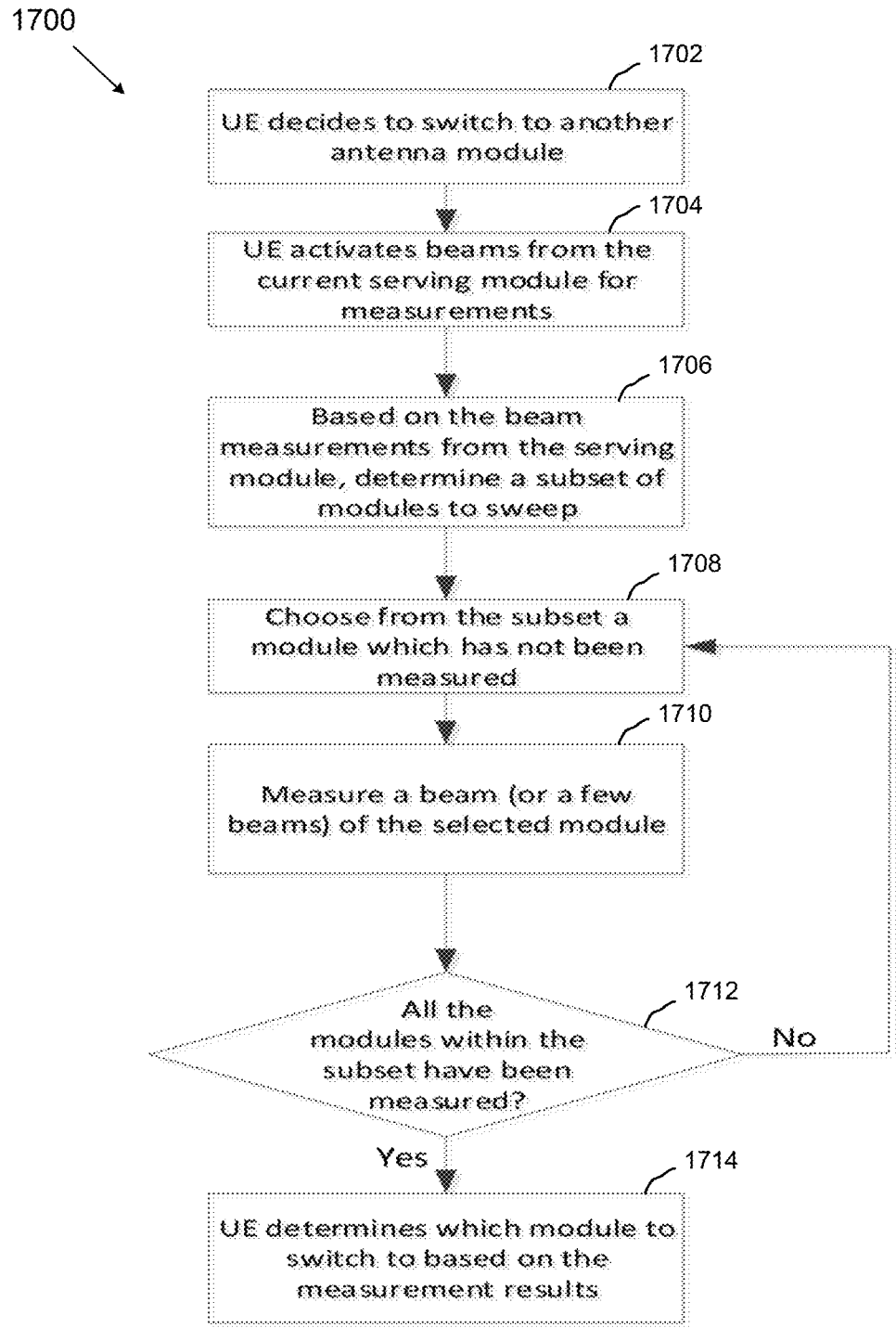
FIG. 17 illustrates a flow chart of a method for operating an electronic device according to embodiments of the present disclosure.

FIG. 17 illustrates a flow chart of a method 1700 for operating an electronic device, as may be performed by an electronic device such as electronic device 116, according to embodiments of the present disclosure. The embodiment of the method 1700 illustrated in FIG. 17 is for illustration only. FIG. 17 does not limit the scope of this disclosure to any particular implementation.

As illustrated in FIG. 17, the method 1700 begins at step 1702. In step 1702, the electronic device (e.g., 111-116 as illustrated in FIG. 1), determines to switch to another antenna module.

In step 1704, the electronic device activates beams from the current serving module for measurements.

In step 1706, the electronic device chooses, based on the beam measurements from the serving module, a subset of modules to measure.

In step 1708, the electronic device chooses a module from the subset which has not been measured.

In step 1710, the electronic device measures a beam (or a few beams) of the selected module.

In step 1712, the electronic device determines whether all of the modules within the subset have been measured. If all of the modules within the subset have not been measured, then the method reverts to step 1708. If all of the modules have been measured, then the method proceeds to step 1714.

In step 1714, the electronic device determines which module to switch to based on the measurement results.

In another approach, an artificial intelligence agent can be trained to configure this sub set.

In another embodiment, the choice of the subset changes with the shape for a foldable device. In other words, when the foldable device changes the folding angle, the choice of the module subset changes. The size of the subset could also change with the folding angle. For example, measuring beams from a single module mounted on the back of the device to determine which module to switch to when the device is fully opened, or measuring beams from two modules mounted on the back of the two screens to determine which module to switch to when the device is fully folded.

Figure 18:
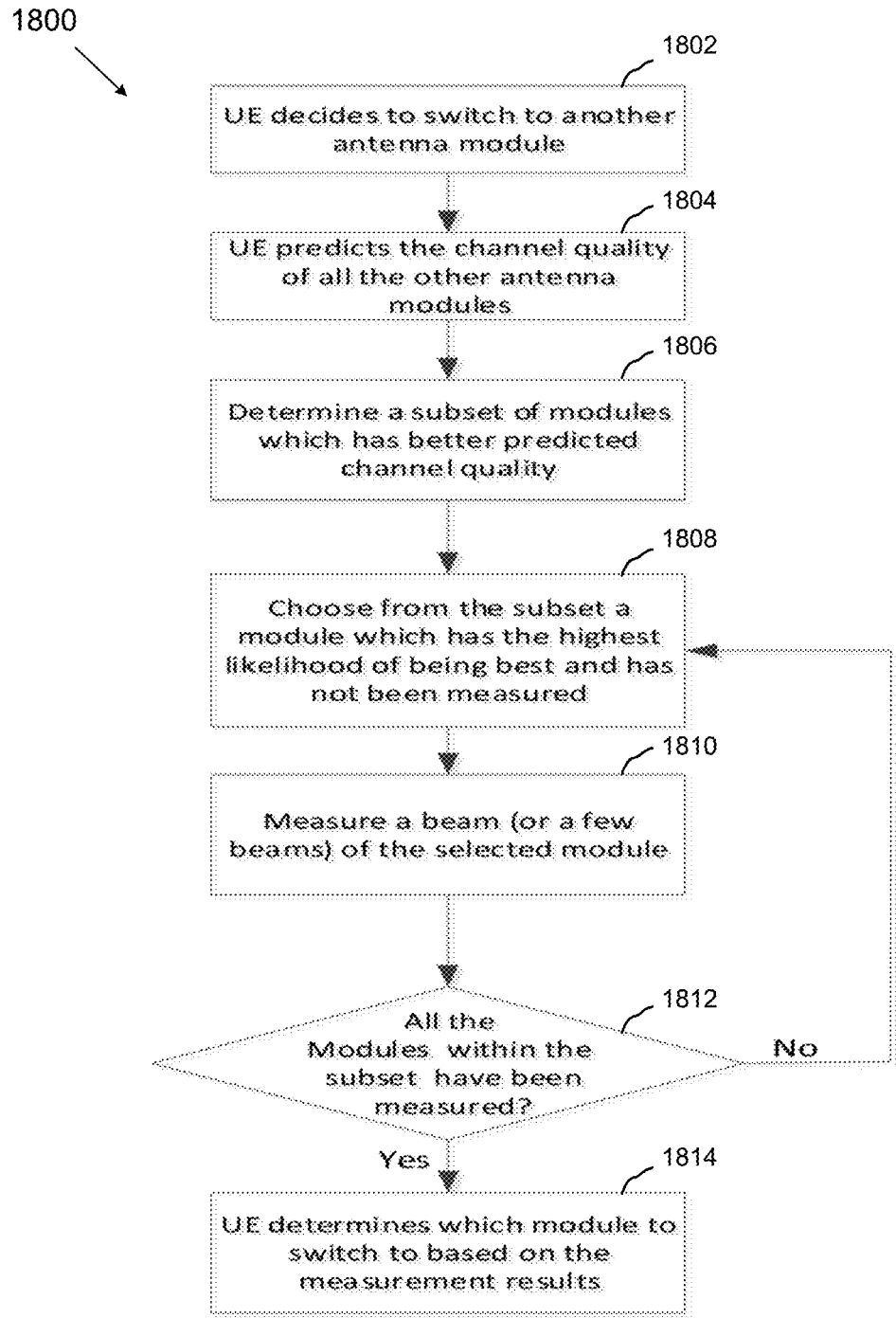
FIG. 18 illustrates a flow chart of a method for operating an electronic device according to embodiments of the present disclosure.

FIG. 18 illustrates a flow chart of a method 1800 for operating an electronic device, as may be performed by an electronic device such as electronic device 116, according to embodiments of the present disclosure. The embodiment of the method 1800 illustrated in FIG. 18 is for illustration only. FIG. 18 does not limit the scope of this disclosure to any particular implementation.

As illustrated in FIG. 18, the method 1800 begins at step 1802. In step 1802, the electronic device (e.g., 111-116 as illustrated in FIG. 1), determines to switch to another antenna module.

In step 1804, the electronic device predicts the channel quality of all other antenna modules.

In step 1806, the electronic device determines a subset of modules that have better predicted channel quality.

In step 1808, the electronic device chooses from the subset a module that has the highest likelihood of being best and has not been measured.

In step 1810, the electronic device measures a beam (or a few beams) of the selected module.

In step 1812, the electronic device determines whether all of the modules within the subset have been measured. If all of the modules within the subset have not been measured, then the method reverts to step 1808. If all of the modules have been measured, then the method proceeds to step 1814.

In step 1814, the electronic device determines which module to switch to based on the measurement results.

In another embodiment, a single module, which is able to beamform towards the coverage region of the other modules is chosen for measurement. For example, the middle module (the module on the top edge or the module on the back) can be chosen for measurement based on this criterion. The middle module is able to generate beams pointing to either the right or left side of the electronic device, thus the measurements from middle-module beams can provide an estimate of the channel quality of the right or left module.

Figure 19:
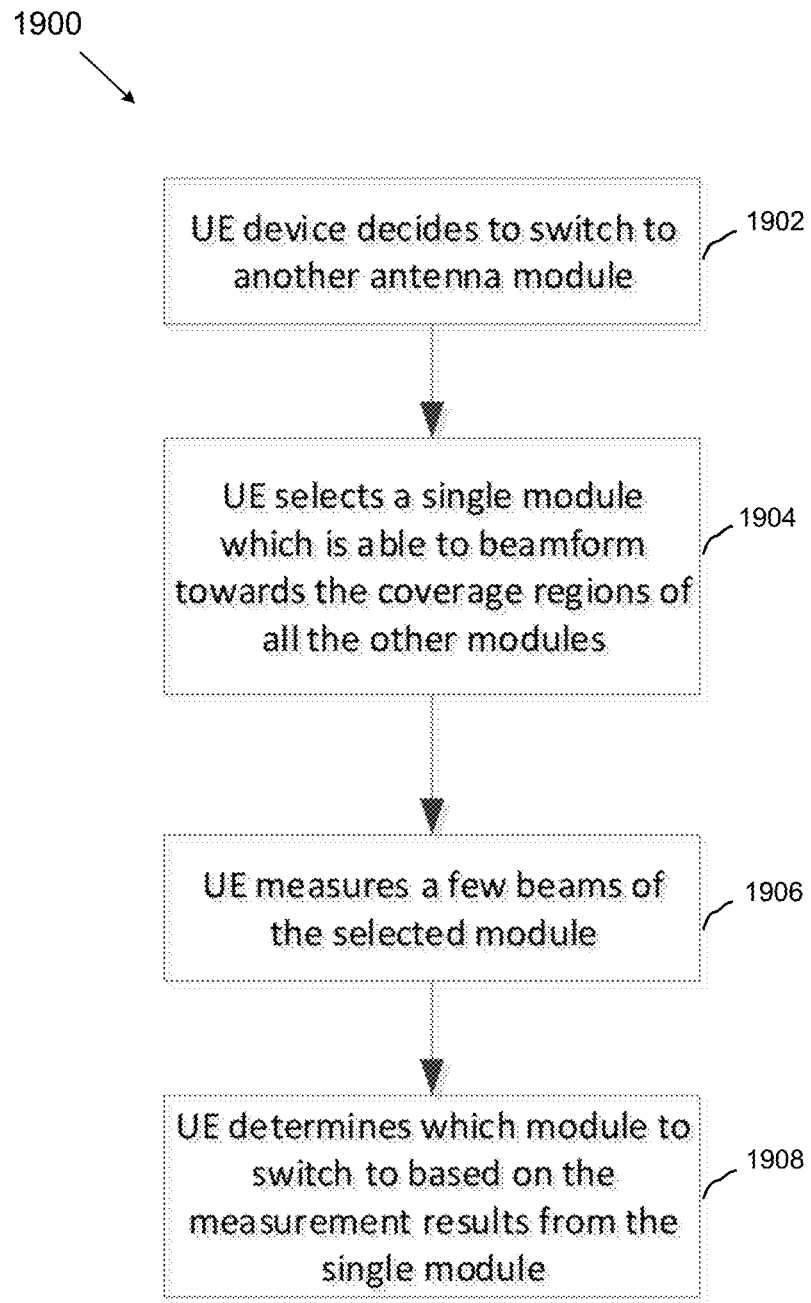
FIG. 19 illustrates a flow chart of a method for operating an electronic device according to embodiments of the present disclosure.

FIG. 19 illustrates a flow chart of a method 1900 for operating an electronic device, as may be performed by an electronic device such as electronic device 116, according to embodiments of the present disclosure. The embodiment of the method 1900 illustrated in FIG. 19 is for illustration only. FIG. 19 does not limit the scope of this disclosure to any particular implementation.

As illustrated in FIG. 19, the method 1900 begins at step 1902. In step 1902, the electronic device (e.g., 111-116 as illustrated in FIG. 1), determines to switch to another antenna module.

In step 1904, the electronic device selects a single module that is able to beamform towards the coverage regions of all the other modules.

In step 1906, the electronic device measures a few beams of the selected module.

In step 1908, the electronic device determines which module to switch to based on the measurement results from the single module.

In one embodiment, the method of measurement beam codebook design for the middle module is as follows. Assume that the electronic device beam codebooks for the data/control channel are $W_R = \{w_1^R, w_2^R, \ldots, w_{k_R}^R\}$, $W_L = \{w_1^L, w_2^L, \ldots, w_{k_L}^L\}$, $W_M = \{w_1^M, w_2^M, \ldots, w_{k_M}^M\}$, where $k_L$, $k_R$, $k_M$ are the codebook size for the left/right/middle module, respectively. The electronic device first identifies the beam pattern of the three codebooks, i.e., $W_R$, $W_L$, $W_M$. Next the electronic device determines the coverage region of the three modules. The coverage region of a module is defined as the spherical region where the codebook of this module achieves larger gain than all the other modules. Then, design one or more beams to cover the coverage region for each codebook, separately. For example, Beam 1d has the similar coverage region as codebook $W_L$, Beam 2d has the similar coverage region as codebook $W_R$, and Beam 3d has the similar coverage region as codebook $W_M$.

Figure 20:
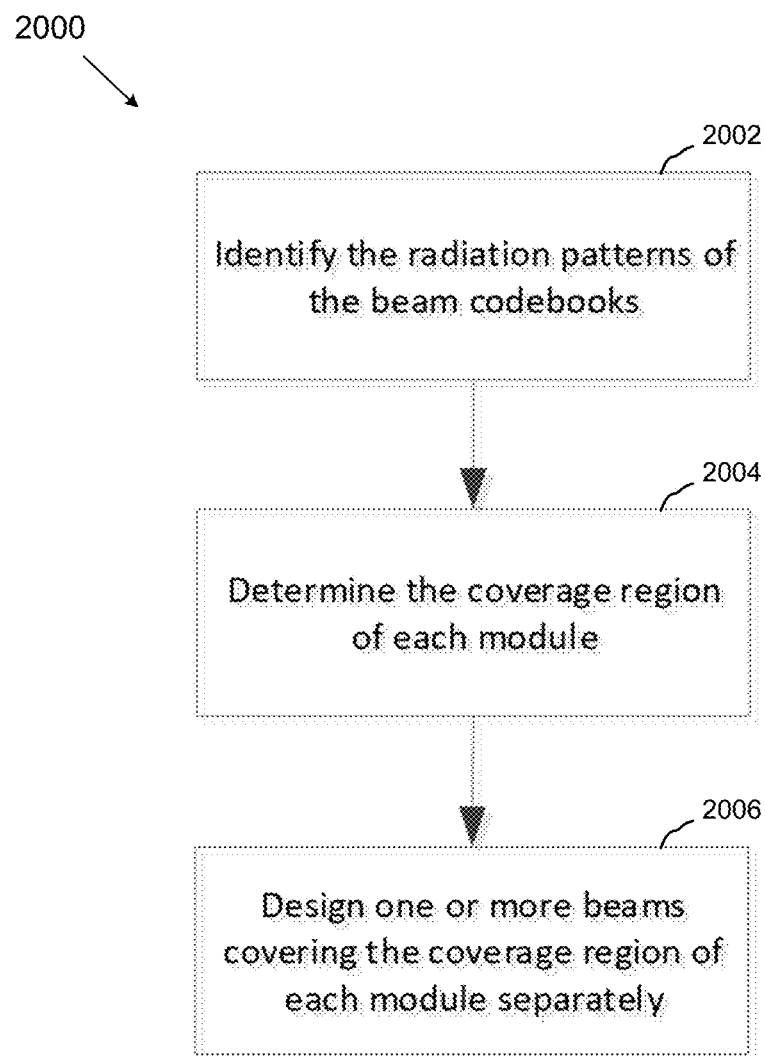
FIG. 20 illustrates a flow chart of a method for operating an electronic device according to embodiments of the present disclosure.

FIG. 20 illustrates a flow chart of a method 2000 for operating an electronic device, as may be performed by an electronic device such as electronic device 116, according to embodiments of the present disclosure. The embodiment of the method 2000 illustrated in FIG. 20 is for illustration only. FIG. 20 does not limit the scope of this disclosure to any particular implementation.

As illustrated in FIG. 20, the method 2000 begins at step 2002. In step 2002, the electronic device (e.g., 111-116 as illustrated in FIG. 1), identifies the radiation patterns of the beam codebooks.

In step 2004, the electronic device determines the coverage region of each module.

In step 2006, the electronic device generates one or more beams covering the coverage region of each module separately.

In another embodiment, the electronic device can stop the antenna module sweeping if a good enough module is found. The electronic device includes all the modules as the candidate modules and measures the modules one by one, but can stop once it finds a module satisfying its requirement. The requirement might be that the RSRP/RSRQ/SINR is above a certain threshold (and the temperature is below another threshold).

Figure 21:
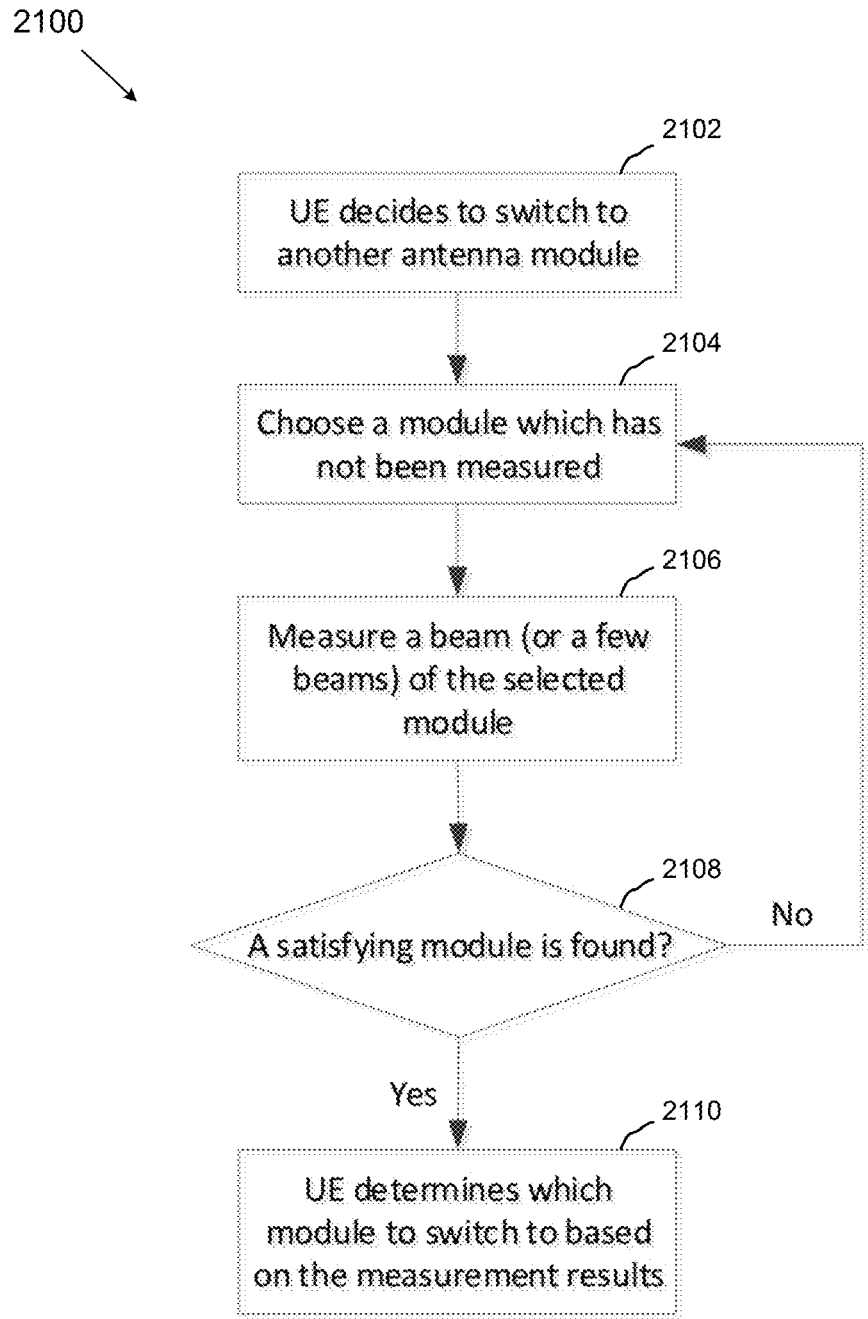
FIG. 21 illustrates a flow chart of a method for operating an electronic device according to embodiments of the present disclosure.

As illustrated in FIG. 21, the method 2100 begins at step 2102. In step 2102, the electronic device (e.g., 111-116 as illustrated in FIG. 1), determines to switch to another antenna module.

In step 2104, the electronic device chooses a module that has not been measured.

In step 2106, the electronic device measures a beam (or a few beams) of the selected module.

In step 2108, the electronic device determines whether a module that satisfies its requirements is found. If a module that satisfies the electronic device's requirements has not been found, then the method reverts to step 2104. If a module that satisfies the electronic device's requirements is found, then the method proceeds to step 2110.

In step 2110, the electronic device determines which module to switch to based on the measurement results.

In one embodiment, the order of sweeping the modules depends on the estimated channel quality of the modules. The electronic device sweeps the antenna modules in the descending order of estimated channel quality. The channel quality may be estimated based on the historical record of RSRP/RSRQ/SINR, the electronic device orientation information from the inertial measurement unit sensors, the electronic device location information from GPS, etc.

In one embodiment, the order of sweeping the modules depends on the likelihood that the antenna module provides the best channel quality. The electronic device sweeps the antenna modules in the descending order of the likelihood. The likelihood may be based on the historical record of RSRP/RSRQ/SINR, the electronic device orientation information from the inertial measurement unit sensors, the electronic device location information from GPS, etc. The likelihood may be obtained by applying the SoftMax function to the estimated channel quality.

Figure 22:
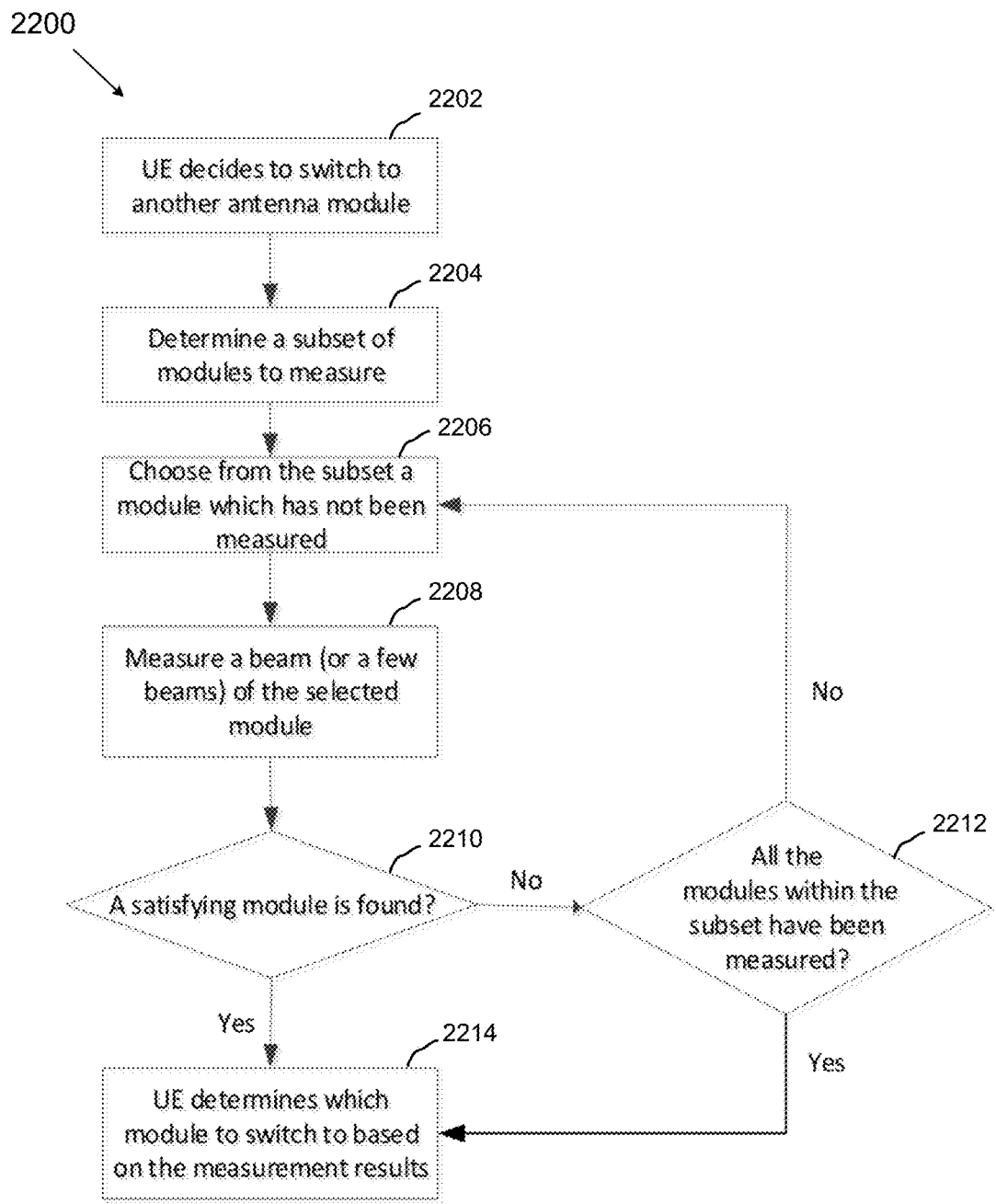
FIG. 22 illustrates a flow chart of a method for operating an electronic device according to embodiments of the present disclosure.

FIG. 22 illustrates a flow chart of a method 2200 for operating an electronic device, as may be performed by an electronic device such as electronic device 116, according to embodiments of the present disclosure. The embodiment of the method 2200 illustrated in FIG. 22 is for illustration only. FIG. 22 does not limit the scope of this disclosure to any particular implementation.

As illustrated in FIG. 22, the method 2200 begins at step 2202. In step 2202, the electronic device (e.g., 111-116 as illustrated in FIG. 1), determines to switch to another antenna module.

In step 2204, the electronic device determines a subset of modules to measure.

In step 2206, the electronic device chooses from the subset a module that has not been measured.

In step 2208, the electronic device measures a beam (or a few beams) of the selected module.

In step 2210, the electronic device determines whether a module that satisfies its requirements is found. If a module that satisfies the electronic device's requirements has not been found, then the method proceeds to step 2112. If a module that satisfies the electronic device's requirements is found, then the method proceeds to step 2114.

In step 2212, the electronic device determines whether all of the modules within the subset have been measured. If all of the modules within the subset have not been measured, then the method reverts to step 2206. If all of the modules within the subset have been measured, then the method proceeds to step 2214.

In step 2214, the electronic device determines which module to switch to based on the measurement results.

Figure 23:
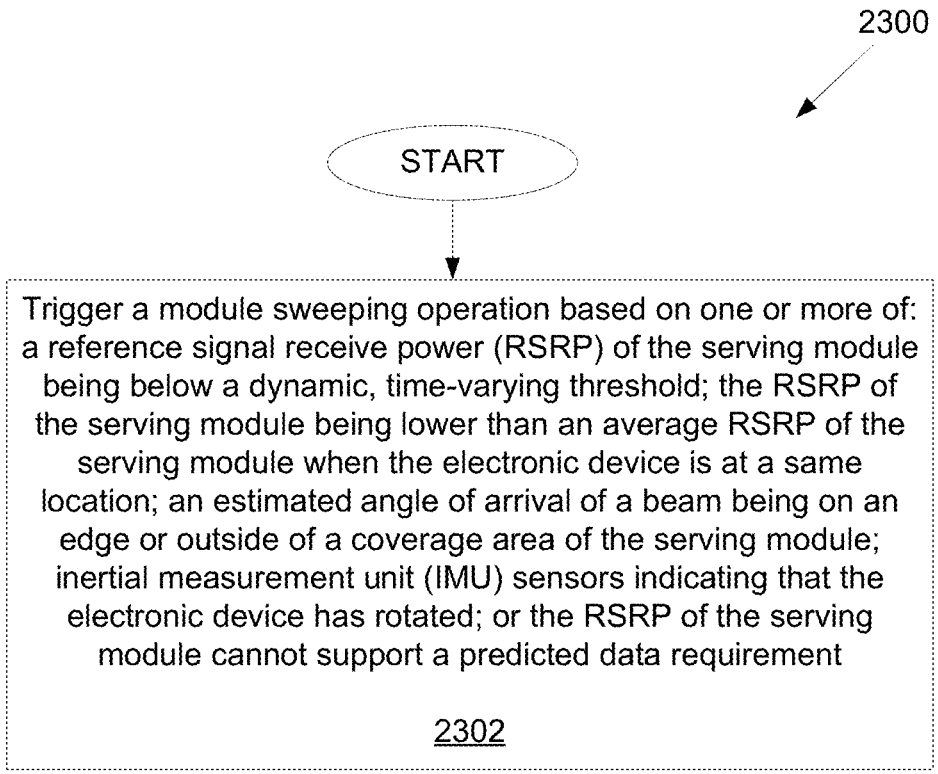
FIG. 23 illustrates a flow chart of a method for operating an electronic device according to embodiments of the present disclosure.

FIG. 23 illustrates a flow chart of a method 2300 for operating an electronic device, as may be performed by an electronic device such as electronic device 116, according to embodiments of the present disclosure. The embodiment of the method 2300 illustrated in FIG. 23 is for illustration only. FIG. 23 does not limit the scope of this disclosure to any particular implementation.

As illustrated in FIG. 23, the method 2300 begins at step 2302. In step 2302, the electronic device (e.g., 111-116 as illustrated in FIG. 1), which has a plurality of antenna modules, where at least one of the plurality of antenna modules is a serving module, triggers a module sweeping operation. The module sweeping operation is triggered based on one or more of: a reference signal receive power (RSRP) of the serving module being below a dynamic, time-varying threshold; the RSRP of the serving module being lower than an average RSRP of the serving module when the electronic device is at a same location; an estimated angle of arrival of a beam being on an edge or outside of a coverage area of the serving module; inertial measurement unit (IMU) sensors indicating that the electronic device has rotated; or the RSRP of the serving module cannot support a predicted data requirement.

In one embodiment, the electronic device computes a short term average RSRP of the serving module; computes a long term average RSRP of the serving module; where the short term average RSRP is a simple moving average or an exponential moving average and the long term average RSRP is a simple moving average or an exponential moving average; and triggers the module sweeping operation if an instantaneous RSRP measurement of the serving module is lower than the long term average RSRP of the serving module, or the short term average RSRP of the serving module is lower than the long term average RSRP of the serving module.

In one embodiment, the electronic device, when computing a short term average RSRP of the serving module or a long term average RSRP of the serving module: clips the RSRP of the serving module at a threshold above which a throughput is saturated, wherein the threshold above which the throughput is saturated comprises a function of system parameters, including one or more of: a system bandwidth configured by a network; a modulation and coding scheme (MCS) configured by the network and the electronic device; a signal-to-noise-ratio/signal-to-interference-and-noise-ratio (SNR/SINR) attainable; or a receiver performance indicator of the electronic device.

In one embodiment, the electronic device stores a long term average RSRP of the serving module and location information of the electronic device; obtains a current RSRP of the serving module at a current location of the electronic device; and triggers the module sweeping operation if the current RSRP of the serving module is lower than the long term average RSRP of the serving module at the current position.

In one embodiment, the electronic device estimates the angle of arrival based on beam measurement of the serving module and a beam radiation pattern, and triggers the module sweeping operation if the estimated angle of arrival of the beam being on an edge or outside of the coverage area of the serving module.

In one embodiment, the electronic device chooses beam operation parameters based on a predicted data requirement from an upper layer and a form factor status of the electronic device.

In one embodiment, the electronic device determines a priority order of the antenna modules; performs the module sweeping operation based on a descending priority order of the antenna modules; and selects an antenna module with a highest priority in the priority order as the serving module if a result of the module sweeping operation is inconclusive as to choosing the serving antenna module.

In one embodiment, the electronic device periodically triggers the module sweeping operation; and dynamically adjusts a period of the module sweeping operation based on one or more of: the RSRP of the serving module being below a dynamic, time-varying threshold; the RSRP of the serving module being lower than an average RSRP of the serving module when the electronic device is at a same location; the estimated angle of arrival of a beam being on an edge or outside of a coverage area of the serving module; inertial measurement unit (IMU) sensors indicating that the electronic device has rotated; or the RSRP of the serving module cannot support a predicted data requirement.

In one embodiment, the electronic device, in response to the module sweeping operation being triggered: sweeps a subset of the plurality of antenna modules during the module sweeping operation; and predicts which module from the subset of antenna modules should be selected as the serving module.

In one embodiment, the electronic device, in response to the module sweeping operation being triggered: selects a module of the plurality of antenna modules that is configured to beamform toward a coverage region of one or more unselected modules of the plurality of antenna modules; measures beams of the selected module; and selects the serving module based on the measured beams.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:
1. An electronic device comprising:
a plurality of antenna modules, wherein at least one of the plurality of antenna modules is a serving module;
a transceiver operably coupled with at least one of the plurality of antenna modules; and
a processor operably coupled to the transceiver, the processor configured to:
trigger a module sweeping operation based on one or more of:
a reference signal receive power (RSRP) of the serving module being below a dynamic, time-varying threshold;
the RSRP of the serving module being lower than an average RSRP of the serving module when the electronic device is at a same location;
an estimated angle of arrival of a beam being on an edge or outside of a coverage area of the serving module;
inertial measurement unit (IMU) sensors indicating that the electronic device has rotated; or
the RSRP of the serving module cannot support a predicted data requirement;
compute a short term average RSRP of the serving module, wherein the short term average RSRP is a simple moving average or an exponential moving average;
compute a long term average RSRP of the serving module, wherein the long term average RSRP is a simple moving average or an exponential moving average; and
trigger the module sweeping operation if an instantaneous RSRP measurement of the serving module is lower than the long term average RSRP of the serving module, or the short term average RSRP of the serving module is lower than the long term average RSRP of the serving module.

2. The electronic device of claim 1, wherein the processor, when computing the short term average RSRP of the serving module or the long term average RSRP of the serving module, is configured to:
clip the RSRP of the serving module at a threshold above which a throughput is saturated, wherein the threshold above which the throughput is saturated comprises a function of system parameters, including one or more of:

a system bandwidth configured by a network;
a modulation and coding scheme (MCS) configured by the network and the electronic device;
a signal-to-noise-ratio/signal-to-interference-and-noise-ratio (SNR/SINR) attainable; or
a receiver performance indicator of the electronic device.

3. The electronic device of claim 1, wherein the processor is configured to:
store the long term average RSRP of the serving module and location information of the electronic device;
obtain a current RSRP of the serving module at a current location of the electronic device; and
trigger the module sweeping operation if the current RSRP of the serving module is lower than the long term average RSRP of the serving module at the current location.

4. The electronic device of claim 1, wherein the processor is configured to:
estimate the angle of arrival based on beam measurement of the serving module and a beam radiation pattern; and
trigger the module sweeping operation if the estimated angle of arrival of the beam being on an edge or outside of the coverage area of the serving module.

5. The electronic device of claim 1, wherein the processor is configured to choose beam operation parameters based on a predicted data requirement from an upper layer and a form factor status of the electronic device.

6. The electronic device of claim 1, wherein the processor is configured to:
determine a priority order of the plurality of antenna modules;
perform the module sweeping operation based on a descending priority order of the plurality of antenna modules; and
select an antenna module with a highest priority in the priority order as the serving module if a result of the module sweeping operation is inconclusive as to choosing the serving module.

7. The electronic device of claim 1, wherein the processor is configured to:
periodically trigger the module sweeping operation; and
dynamically adjust a period of the module sweeping operation based on one or more of:
the RSRP of the serving module being below a dynamic, time-varying threshold;
the RSRP of the serving module being lower than an average RSRP of the serving module when the electronic device is at a same location;
the estimated angle of arrival of a beam being on an edge or outside of a coverage area of the serving module;
inertial measurement unit (IMU) sensors indicating that the electronic device has rotated; or
the RSRP of the serving module cannot support a predicted data requirement.

8. The electronic device of claim 1, wherein:
in response to the module sweeping operation being triggered, the processor is configured to:
sweep a subset of the plurality of antenna modules during the module sweeping operation; and
predict which module from the subset of the plurality of antenna modules should be selected as the serving module.

9. The electronic device of claim 1, wherein:
in response to the module sweeping operation being triggered, the processor is configured to:
select a module of the plurality of antenna modules that is configured to beamform toward a coverage region of one or more unselected modules of the plurality of antenna modules;
measure beams of the selected module; and
select the serving module based on the measured beams.

10. A method for operating an electronic device having a plurality of antenna modules, wherein at least one of the plurality of antenna modules is a serving module, the method comprising:
triggering a module sweeping operation based on one or more of:
a reference signal receive power (RSRP) of the serving module being below a dynamic, time-varying threshold;
the RSRP of the serving module being lower than an average RSRP of the serving module when the electronic device is at a same location;
an estimated angle of arrival of a beam being on an edge or outside of a coverage area of the serving module;
inertial measurement unit (IMU) sensors indicating that the electronic device has rotated; or
the RSRP of the serving module cannot support a predicted data requirement;
computing a short term average RSRP of the serving module, wherein the short term average RSRP is a simple moving average or an exponential moving average;
computing a long term average RSRP of the serving module, wherein the long term average RSRP is a simple moving average or an exponential moving average; and
triggering the module sweeping operation if an instantaneous RSRP measurement of the serving module is lower than the long term average RSRP of the serving module, or the short term average RSRP of the serving module is lower than the long term average RSRP of the serving module.

11. The method of claim 10, further comprising:
when computing the short term average RSRP of the serving module or the long term average RSRP of the serving module:
clipping the RSRP of the serving module at a threshold above which a throughput is saturated, wherein the threshold above which the throughput is saturated comprises a function of system parameters, including one or more of:
a system bandwidth configured by a network;
a modulation and coding scheme (MCS) configured by the network and the electronic device;
a signal-to-noise-ratio/signal-to-interference-and-noise-ratio (SNR/SINR) attainable; or
a receiver performance indicator of the electronic device.

12. The method of claim 10, further comprising:
storing the long term average RSRP of the serving module and location information of the electronic device;
obtaining a current RSRP of the serving module at a current location of the electronic device; and
triggering the module sweeping operation if the current RSRP of the serving module is lower than the long term average RSRP of the serving module at the current location.

13. The method of claim 10, further comprising:
estimating the angle of arrival based on beam measurement of the serving module and a beam radiation pattern; and
triggering the module sweeping operation if the estimated angle of arrival of the beam being on an edge or outside of the coverage area of the serving module.

14. The method of claim 10, further comprising:
choosing beam operation parameters based on a predicted data requirement from an upper layer and a form factor status of the electronic device.

15. The method of claim 10, further comprising:
determining a priority order of the plurality of antenna modules;
performing the module sweeping operation based on a descending priority order of the plurality of antenna modules; and
selecting an antenna module with a highest priority in the priority order as the serving module if a result of the module sweeping operation is inconclusive as to choosing the serving module.

16. The method of claim 10, further comprising:
periodically triggering the module sweeping operation; and
dynamically adjusting a period of the module sweeping operation based on one or more of:
the RSRP of the serving module being below a dynamic, time-varying threshold;
the RSRP of the serving module being lower than an average RSRP of the serving module when the electronic device is at a same location;
the estimated angle of arrival of a beam being on an edge or outside of a coverage area of the serving module;
inertial measurement unit (IMU) sensors indicating that the electronic device has rotated; or
the RSRP of the serving module cannot support a predicted data requirement.

17. The method of claim 10, further comprising:
in response to the module sweeping operation being triggered:
sweeping a subset of the plurality of antenna modules during the module sweeping operation; and
predicting which module from the subset of the plurality of antenna modules should be selected as the serving module.

18. The method of claim 10, further comprising:
in response to the module sweeping operation being triggered:
selecting a module of the plurality of antenna modules that is configured to beamform toward a coverage region of one or more unselected modules of the plurality of antenna modules;
measuring beams of the selected module; and
selecting the serving module based on the measured beams.

19. An electronic device comprising:
a plurality of antenna modules, wherein at least one of the plurality of antenna modules is a serving module;
a transceiver operably coupled with at least one of the plurality of antenna modules; and
a processor operably coupled to the transceiver, the processor configured to:
trigger a module sweeping operation based on one or more of:
a reference signal receive power (RSRP) of the serving module being below a dynamic, time-varying threshold;
the RSRP of the serving module being lower than an average RSRP of the serving module when the electronic device is at a same location;
an estimated angle of arrival of a beam being on an edge or outside of a coverage area of the serving module;
inertial measurement unit (IMU) sensors indicating that the electronic device has rotated; or
the RSRP of the serving module cannot support a predicted data requirement;
store a long term average RSRP of the serving module and location information of the electronic device;
obtain a current RSRP of the serving module at a current location of the electronic device; and
trigger the module sweeping operation if the current RSRP of the serving module is lower than the long term average RSRP of the serving module at the current location.

20. The electronic device of claim 19, wherein the processor is further configured to:
determine a priority order of the plurality of antenna modules;
perform the module sweeping operation based on a descending priority order of the plurality of antenna modules; and
select an antenna module with a highest priority in the priority order as the serving module if a result of the module sweeping operation is inconclusive as to choosing the serving module.

* * * * *